United States Patent [19]
Buchanan et al.

[11] Patent Number: 5,515,490
[45] Date of Patent: May 7, 1996

[54] METHOD AND SYSTEM FOR TEMPORALLY FORMATTING DATA PRESENTATION IN TIME-DEPENDENT DOCUMENTS

[75] Inventors: M. Cecelia Buchanan, Moscow, Id.; Polle T. Zellweger, Palo Alto, Calif.

[73] Assignee: Xerox Corporation, Stamford, Conn.

[21] Appl. No.: 148,743

[22] Filed: Nov. 5, 1993

[51] Int. Cl.$^6$ .................................... G06F 15/00
[52] U.S. Cl. ............................................. 395/154
[58] Field of Search .................................. 395/148, 149, 395/152, 153, 154, 161

[56] References Cited

U.S. PATENT DOCUMENTS

| | | | |
|---|---|---|---|
| 4,600,919 | 7/1986 | Stern | 345/122 |
| 4,893,256 | 1/1990 | Rutherford et al. | 395/154 |
| 5,065,345 | 11/1991 | Knowles et al. | 395/154 |
| 5,119,474 | 6/1992 | Beitel et al. | 395/154 |
| 5,274,758 | 12/1993 | Beitel et al. | 395/154 |
| 5,385,475 | 1/1995 | Sudman et al. | 434/307 R |
| 5,394,548 | 2/1995 | Nakajima et al. | 395/154 |
| 5,420,801 | 5/1995 | Dockter et al. | 364/514 R |
| 5,471,576 | 11/1995 | Yee | 395/154 |

OTHER PUBLICATIONS

Blakowski G., Hubel J., and Langrehr U., "Tools for specifying and executing synchronized multimedia presentations", in R. G. Herrtwich, ed., Network and Operating System Support for Digital Audio and Video, Lecture Notes in Computer Science No. 614, Springer–Verlag, 1992.

Blakowski G., Hubel J., and Langrehr U., "Tool support for the synchronization and presentation of distributed multimedia", Computer Communications 15, 10 (Dec. 1992), pp. 611–618.

Buchanan M. C. and Zellweger P., "Scheduling multimedia documents using temporal constraints", in: Proceeding of the 3rd Int'l Workshop on Network and OS support for Digital Audio and Video, San Diego, CA, Nov. 12–13, 1992, pp. 1–13.

Buchanan M. C. and Zellweger P., "Specifying temporal behavior in hypermedia documents", in: Lucarella D., Nanard J., Nanard M., Paolini P. (eds, Proceeding of the ACM European Conference on Hypertext, ACM Press, Milan, Italy, Dec. 1992, pp. 1–10.

(List continued on next page.)

Primary Examiner—Heather R. Herndon
Assistant Examiner—Joseph R. Burwell
Attorney, Agent, or Firm—Judith C. Bares

[57] ABSTRACT

A method and system automatically produce a temporal layout for controlling the presentation of a multimedia document. A partial temporal layout, or schedule, is produced during a compiletime phase of the method from duration information about the media items included in the document, and from the temporal relationships between the media items, as specified by a document author. Several temporal relationships are supported, including "simultaneous with", for synchronization of two media items or events, and relationships such as "before by 10 seconds." The temporal formatter positions media data items having predictable behavior in time according to the specified temporal relationships and using the specified durations, and creates an auxiliary temporal layout with unresolved times for each media data item or event therein having unpredictable behavior. The temporal formatter automatically produces temporal layouts for documents that include media items for which internal events and continuously adjustable durations are specified, thereby providing for very flexible positioning of media items in time without the author's involvement. The author of the document may specify a flexibility metric at the media or event level related to the continuously adjustable durations that provides the temporal formatter with guidance as to how to best position temporally related media items in time. In an illustrated embodiment, the flexibility metric consists of duration-adjustment costs, and the temporal formatter uses linear programming to solve for solutions to equations formulating the temporal constraints between connected components in the document.

33 Claims, 9 Drawing Sheets

Bulterman D., van Rossum G., and van Liere R., "A structure for transportable, dynamic multimedia documents" in Proceedings 1991 Summer USENIX Conference, Nashville, TN, Jun. 1991, pp. 137–155.

Bulterman D., "Synchronization of multi-sourced multimedia data for heterogeneous target systems", in Proceedings Third International Workshop on Network and Operating System Support for Digital Audio and Video, San Diego, CA, Nov. 12–13, 1992, pp. 110–120.

Drapeau G., and Greenfield H. "MAEstro–A distributed multimedia authoring environment", in Proceedings 1991 Summer USENIX Conference, Nashville, TN, Jun. 1991, pp. 315–328.

Drapeau G., "Synchronization in the MAEstro multimedia authoring environment", in Proceedings of the First ACM Int'l Conference on Multimedia 1993, Anaheim, CA, Aug. 1993, pp. 331–339.

Fiume E., Tsichritzis D, and Dami L. "A temporal scripting language for object–oriented animation", in Proceedings Eurographics'87, Elsevier Science Publishers, North–Holland Publishing Company, Amsterdam 1987. pp. 1–12.

Hamakawa R., Sakagami H., and Rekimoto J., "Audio and video extensions to graphical user interface toolkits", in Proceedings Third International Workshop on Network and Operating System Support for Digital Audio and Video, San Diego, CA, Nov. 12–13, 1992, pp. 356–361.

Hamakawa R., and Rekimoto J., "Object Composition and Playback Models for Handling Multimedia Data", in Proceedings of the First ACM Int'l Conference on Multimedia 1993, Anaheim, CA, Aug. 1993.

Kim W., Kenchammana–Hosekote D., Lim E. P., and Srivastava J., "Synchronization Relation Tree: A model for temporal synchronization in multimedia presentations," Tech. Rep. 92–42, U. of Minnesota, Computer Science Dept., 1992, pp. 1–30.

Swinehart D., Zellweger P., Beach R., and Hagmann R., "A structural view of the Cedar programming environment", in ACM Trans. Prog. Languages and Syst. 8, 4 (Oct. 1986), pp. 419–490.

van Rossum G., Jansen J., Mullender K. S., and Bulterman D. "CMIFed: A presentation environment for portable hypermedia documents", in Proceedings of the First ACM Int'l Conference on Multimedia 1993, Anaheim, CA, Aug. 1993. pp. 183–188.

Koegel J., Keskin C., and Rutledge J, "Toolkits for multimedia interface design." In Proceedings Xhibition '92, San Jose, CA, Jun. 1992, 275–285.

Buchanan M. C. and Zellweger P., "Automatic Temporal Layout Mechanisms", in: Proceedings of the First ACM Int'l Conference on Multimedia 1993, Anaheim, CA, Aug. 1993.

Little T. and Ghafoor A., "Synchronization and storage models for multimedia objects", IEEE J. Selected Areas of Communication, 8,3 (Apr. 1990). pp. 413–427.

Macromedia Director (for Macintosh, Version 4), Using Director:pp. 163–169, 243–249, 264–269, 446–447; Lingo Dictionary: p. 296; Feb. 1994.

Ogawa R., Harada H. and Kameko A., "Scenario–based hypermedia: A Model and a System", in: Risk A., Streitz N., Andre J. (eds), Hypertext: Concepts, systems, and applications, Cambridge Univ. Press, 1990, pp. 38–51.

Poole L. "QuickTime in motion", MACWORLD (Sep. 1991), 154–159.

Stotts D. and Furuta R., "Temporal hyperprogramming", in J. Visual Languages and Computing 1,3 (Sep. 1990), pp. 237–253.

Dechter, R., Meiri, I., and J. Pearl, "Temporal constraint networks," Artificial Intelligence 49, Elsevier, 1991, pp. 61–95.

METHOD AND SYSTEM FOR TEMPORALLY FORMATTING DATA PRESENTATION IN TIME-DEPENDENT DOCUMENTS

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

1. Field of the Invention

The present invention relates generally to processor-based multimedia information authoring and presentation systems, and more particularly to a processor-based method and system for the automatic temporal formatting (scheduling) of multimedia documents.

2. Background

Information presented in the form of a traditional document has a spatial layout that indicates where the information, such as text, graphics, and images, is to be presented in the document space. Information in the traditional document is static, or unchanging, in time. In contrast, a multimedia information presentation, while perhaps also having a spatial layout for at least some portions of the information, is dynamic, and presentation of the information as a whole involves consideration of time relationships between constituent parts. The introduction of the time dimension in multimedia information presentations raises a complex set of authoring and presentation issues that center around the scheduling of the presentation. First, in order to convey information effectively, the various data components, or media, of a multimedia information presentation must be scheduled to occur at specific times. In addition, some of the media may be presented concurrently with other media, requiring coordination of the information presentations. Moreover, in interactive multimedia information presentations where a system user is permitted to interact with the presentation, such as, for example, in a hypertext or hypermedia environment, the user's interactions will affect the scheduling of other media events. These interactions, known as unpredictable events, must also be smoothly integrated into the multimedia presentation.

A brief discussion of existing multimedia authoring and presentation systems will highlight some of the deficiencies that exist with respect to scheduling the presentation of a multimedia document. In the remainder of this description, an abbreviation enclosed in brackets ([]) refers to a publication that contains information about the idea with which the bracketed abbreviation is associated. The author and title of the referenced publication may be found in Section D, below. Also, in the remainder of the description, the system user who creates the multimedia document will be referred to as the "author," and the system user who observes and hears the presentation of the document will be referred to as the "reader." These may be the same person.

In a multimedia authoring and presentation system, the author of a multimedia document either creates or identifies the individual data components, called "media items," to be included in the document. The author may also have the capability of specifying a portion of a media item, called a "media segment," for inclusion in the document, and media segment and media item may be used interchangably herein. The author then specifies a relationship between the media items with respect to time that is to govern the actual presentation of the document to the reader. These relationships between media items with respect to time will be referred to herein as "temporal relationships." The author, in specifying the temporal relationship, provides a "temporal specification." In order to provide for the creation of a multimedia document having a rich set of capabilities, the authoring system should support the creation and specification of media items having both fine granularity and continuously adjustable durations. In addition, the system should support specifying a variety of different temporal relationships between media items, and should allow for the specification of a measurement, or metric, that indicates the quality of the resulting presentation if durations of media items are adjusted, or the expense of adjusting a duration. (Section A. below describes these concepts in more detail.)

The process of determining from a temporal specification when to present the individual components of information in a multimedia document may be a very complex one, depending on the variety of temporal relationships supported and whether fine granularity and continuously adjustable durations are supported. The process of determining the set of times for presenting media items included in a multimedia document from the author's temporal specification will be referred to herein as "temporally formatting" the multimedia document. The set of times for presenting media items included in a multimedia document will be referred to herein as the document's "temporal layout," or schedule.

A variety of factors in addition to the temporal relationship among media items, such as the duration of each individual media item, the coordination of one media item with another, and the preparation time and playback rate of the various presentation devices involved, to name but a few, must also be considered in formatting the temporal specification into an .actual temporal layout that can be used to schedule the presentation of the media items on the appropriate presentation devices. First generation multimedia authoring and presentation systems require the author of the multimedia presentation to temporally format, or schedule, media items manually, before a multimedia document is presented. This is analogous to the system user of a bitmap or graphical editor manually laying out the text, graphics, and images spatially in a document before the system prints or displays the document. Several existing multimedia authoring and presentation systems require authors to create temporal layouts manually by positioning media items on a document timeline [Drapeau 91], [MacroMind 89], [Ogawa 90], [QuickTime 91], a tedious and error-prone process. Other manual methods include temporal scripting languages [Fiume 87] and object composition Petri nets [Little 1990]. These manual systems place the burden on the author of the document to sort out the complex temporal relationships among media items, to position the media item in time, to adjust presentation rates when necessary, and to edit the durations of media items when necessary, leading to much trial and error before a successful presentation can be achieved.

Automatic temporal formatters attempt to relieve the author of some of the complexities of the temporal formatting task. An automatic temporal formatter uses a temporal specification, which consists of certain descriptive information about the media items and the temporal relationships among the media items, to produce a temporal layout that indicates when events in a document should occur. Some formatters also make use of an environment specification, which describes the characteristics and capabilities of the workstation and network of the target environment, to further refine the temporal layout. The temporal layout is used to control the document's actual physical presentation on the presentation device or devices. An automatic temporal formatter can be evaluated using the measurement criteria of (i) its flexibility in assigning times to media items; (ii) the types of different temporal behavior it handles; (iii) its ability to detect temporal mismatches among the specified temporal relationships of the media items; and (iv) when in the document production cycle the automatic formatter executes.

An automatic temporal formatter may execute either before the document is presented, referred to as a "compiletime" scheduler or formatter; while the document is being presented, referred to as a "runtime" scheduler or formatter; or at both times, referred to as a "hybrid" scheduler or formatter. The characteristic of when an automatic temporal formatter is executed affects both the quality and the expressiveness of the presentation. A compiletime formatter can improve the appearance of the resulting documents by simply having the ability to look ahead at temporal relationships specified between media items in order to assign starting times for them, and by taking full advantage of the flexibility of the media item durations and the temporal relationships to smooth out predeterminable temporal and environment mismatches before the document is actually presented. In addition, a compiletime formatter can identify errors that normally would not be detected until runtime, if at all. These errors include inconsistencies in the temporal specification, such as unsatisfiable temporal relationships, and inconsistencies because of the environment in which the document is going to be displayed, such as the lack of a particular type of presentation device. This type of error checking performed at compiletime incurs no additional computational resources because the algorithm that does the error checking is the same one that produces the temporal layout. In contrast, a runtime formatter typically does not detect mismatches until a portion of the document has already been presented. This delay in detection limits a runtime formatter's ability to smooth out mismatches and often produces a choppy presentation. However, an automatic temporal formatter executing at runtime, unlike a compiletime formatter, can accommodate unpredictable behavior, such as unpredictable events and media data having unpredictable durations. A hybrid scheduler may provide a compiletime formatter that handles the predictable portions of the temporal specification and a runtime formatter that handles the unpredictable portions.

Several existing runtime temporal formatters accommodate media items having a broad range of characteristics, and consequently are able to produce automatic schedules of varying flexibility and quality. Each of these runtime temporal formatters also accommodate some aspects of the unpredictable behavior that arises from media data specified as having unpredictable durations or specified as including unpredictable events. A system known as "Trellis" disclosed by Stotts et al., [Stotts 1990], uses a temporal data flow representation based on timed Petri nets to describe both the structure and the browsing semantics of hypertext documents. The system has been implemented using text media items. Fiume et al. disclose an object-oriented temporal scripting language which an author uses to compose multimedia objects. [Fiume 87.] Fiume et al. disclose a language that supports media items with fine granularity, that have predictable durations. The language includes behavior specification called temporal transformations that allow an author to manually specify actions such as positioning an object in absolute time, scaling the duration of an object (i.e., continuous adjustment), or inverting the (temporal) direction of a media item between "forward" and "backward". The compiler-interpreter for this language is, in effect, its runtime temporal formatter.

Another runtime temporal formatter is disclosed by Bulterman et al. and addresses the problem of presenting multimedia documents in a heterogeneous hardware environment [Bulterman 1991]. The runtime temporal formatter disclosed by Bulterman et al., called "the player," supports media items, called data blocks, that have coarse granularity and predictable durations. It is unclear whether media items with unpredictable durations are supported. However, media item durations are not flexible, and therefore no metric is provided for adjusting them. The range of temporal specifications supported include binary ordering relations, called synchronization arcs, that may be placed between the endpoints of media items, and sequential and parallel ordering relations among intervals.

An existing hybrid temporal formatter, called MODE (Multimedia Objects in a Distributed Environment), was designed to address the problem of presenting multimedia documents in distributed, heterogeneous hardware environments. [Blakowski 1992.] Blakowski et al. disclose a temporal formatter that supports media items called objects that have fine granularity, predictable and unpredictable durations, and continuously adjustable durations. Events included within media items are called reference points. MODE supports interactive objects that allow readers to control a document's presentation dynamically. It appears, however, that the predictable durations of continuously adjustable media items are not adjustable at compiletime. MODE's hybrid formatter provides a compiletime component called the Optimizer and a runtime component called the Synchronizer. The input to each component consists of a temporal layout, manually constructed by the author using a timeline approach, and an environment specification. Therefore, neither the Optimizer nor the Synchronizer automatically produces a temporal layout. The Optimizer uses the environment specification to select a presentation style to be used for this presentation of the document that is dependent on the actual types of hardware available in the current environment. Blakowski et al. also disclose that MODE provides for a metric called "priorities" which may be associated with each object to describe its sensitivity to media delays. With respect to synchronization of media data, Blakowski et al. disclose that MODE supports temporal relationships called synchronization points that connect two or more reference points. Synchronization is performed by a signaling mechanism and accomplished at runtime. Each presentation thread reaching a synchronization point sends a corresponding signal to all other presentation threads involved in the synchronization point. After the dispatch of all signals, the presentation thread waits until it receives signals from all the other participating threads of the synchronization point before proceeding. In addition, the runtime Synchronizer component allows receiving media items to make continuous (shrinking) adjustments to their durations to reach the synchronization point faster, and/or allows sending media items to stretch their durations to wait for the other media items. The Synchronizer component of the temporal formatter handles media delays via this signaling mechanism at runtime, using the priorities.

Existing automatic temporal formatters handle media items with diverse sets of characteristics, making their functionality difficult to compare. Many of the existing multimedia authoring systems require the author to manually produce a temporal layout by assigning times to the media data included in the document. For documents having a rich set of capabilities that permit the specification of a wide variety of inter-media item temporal relationships, manual scheduling is exceedingly burdensome to the author. An automatic temporal formatter should relieve most of this burden. However, in order to present a multimedia document having a rich set of capabilities, it is essential that an automatic temporal formatter handle media items of both coarse and fine granularity, and that have continuously adjustable durations. It appears that none of the formatters described above having only a runtime component are able to produce a schedule automatically for media items having predictable and continuously adjustable durations, and some of these formatters do not support media items having fine granularity. The hybrid formatter disclosed by Blakowski et al., while supporting a rich set of media item specification, appears to require a manually produced temporal layout as input to each of its compiletime and runtime components, and thus it appears not to actually produce a schedule automatically, but to optimize the manually produced schedule for the particular presentation environment, and to handle synchronization and aspects of unpredictable behavior at runtime.

What is needed is a significantly improved automatic multimedia document presentation scheduler requiring less manual scheduling effort on the part of the author and accommodating media items having continuously adjustable durations and unpredictable behavior as early in the process of presenting the document as possible in order to detect inconsistencies and/or mismatches early in the presentation process.

SUMMARY OF THE INVENTION

The method and system of the present invention provide a compiletime component of a temporal formatter that automatically constructs a partial temporal layout for media segments having predictable behavior. The temporal formatter flexibly positions in time, at the event level, the media items included in a document using a range of times specified for each media item while still satisfying the temporal relationships between media item events, as specified by the author. The temporal relationships that may be specified include several relative relationships (e.g., before by 10 seconds, before by at least 15 seconds, and before by between 10 and 20 seconds) in addition to the standard "simultaneous with" temporal relationship, thus requiring the temporal formatter to do more than merely synchronize events in order to position the media items in time effectively. If a specified temporal relationship between two events cannot be satisfied by positioning a media item in time, the temporal formatter further is able to adjust the duration of one or more media items as necessary to satisfy temporal relationships. For any two media item events that cannot be initially positioned to satisfy a specified temporal relationship, the temporal formatter uses a flexibility metric, which may be specified at both the media item level and at the document level, to determine which media item duration of the two media item events should be changed, whether to lengthen ("stretch") or shorten ("shrink") the duration to be changed, and by how much. The method provides a wide range of flexibility in positioning media events, and relieves the burden of this positioning from the document author. In addition, this temporal formatting is accomplished before displaying the document, representing a significant improvement over existing schedulers which do not make adjustments until the document is being displayed at runtime.

Thus, the method and system of the present invention are able to effectively support and schedule media items that have a rich set of capabilities including fine granularity, continuously adjustable durations, and the explicit representation of temporal relationships among media items in a document.

Moreover, the method of automatically providing a temporal format for a multimedia document also produces a consistent schedule for media items having unpredictable behavior. This is especially important for the effective production of interactive multimedia documents, which are used in a variety of environments such as education. An interactive multimedia document can act as a multimedia user interface, and thus a multimedia document authoring system can act as a multimedia user interface builder. Interactive multimedia documents must support rich coordination between their predictable and unpredictable portions so that the necessary connections can be made between the user interfaces and the applications they control. The automatic temporal formatter of the present invention supports the rich set of capabilities needed by an interactive multimedia document environment and successfully accommodates media items having unpredictable behavior.

Therefore, in accordance with the present invention, there is provided a method of temporally formatting a plurality of media items included in a time-dependent document in an information presentation system. Each media item is capable of producing human perceptions when presented by a media presentation device. The system includes memory for storing data, and a processor connected for accessing the data stored in the memory. The data stored in the memory includes instruction data indicating instructions the processor executes. The method comprises operating the system processor to obtain temporal constraint data indicating a time ordering relation value between first and second temporally related media items. The processor also obtains media item durational time values and flexibility metric data for each media item. Each durational time value indicates a duration range of predictable elapsed presentation durations for a respective media item. The duration range includes an optimum duration. The flexibility metric data associates a measurement with each of selected durations other than the optimum duration within the range of durations. The processor then assigns document presentation time values to each media item. Each document presentation time value assigned to a respective one of the media items produces a computed duration within the range of durations indicated for the respective media item, and satisfies the temporal constraint data specified between the respective media item and a second media item. The document presentation time values assigned to media items are computed using a linear programming technique to solve a linear function that minimizes a measurement associated with lengthening and shortening media item durations for respective media items. The linear function is subject to a plurality of linear constraints that are selected from a group of constraints including media item durations, flexibility metric data for respective media item durations, and temporal constraint data between pairs of media items.

The novel features that are considered characteristic of the present invention are particularly and specifically set forth in the appended claims. The invention itself, however, both as to its organization and method of operation, together with its advantages, will best be understood from the following description of the illustrated embodiment when read in connection with the accompanying drawings. In the Figures, the same numbers have been used to denote the same component parts and acts.

Figure 1:
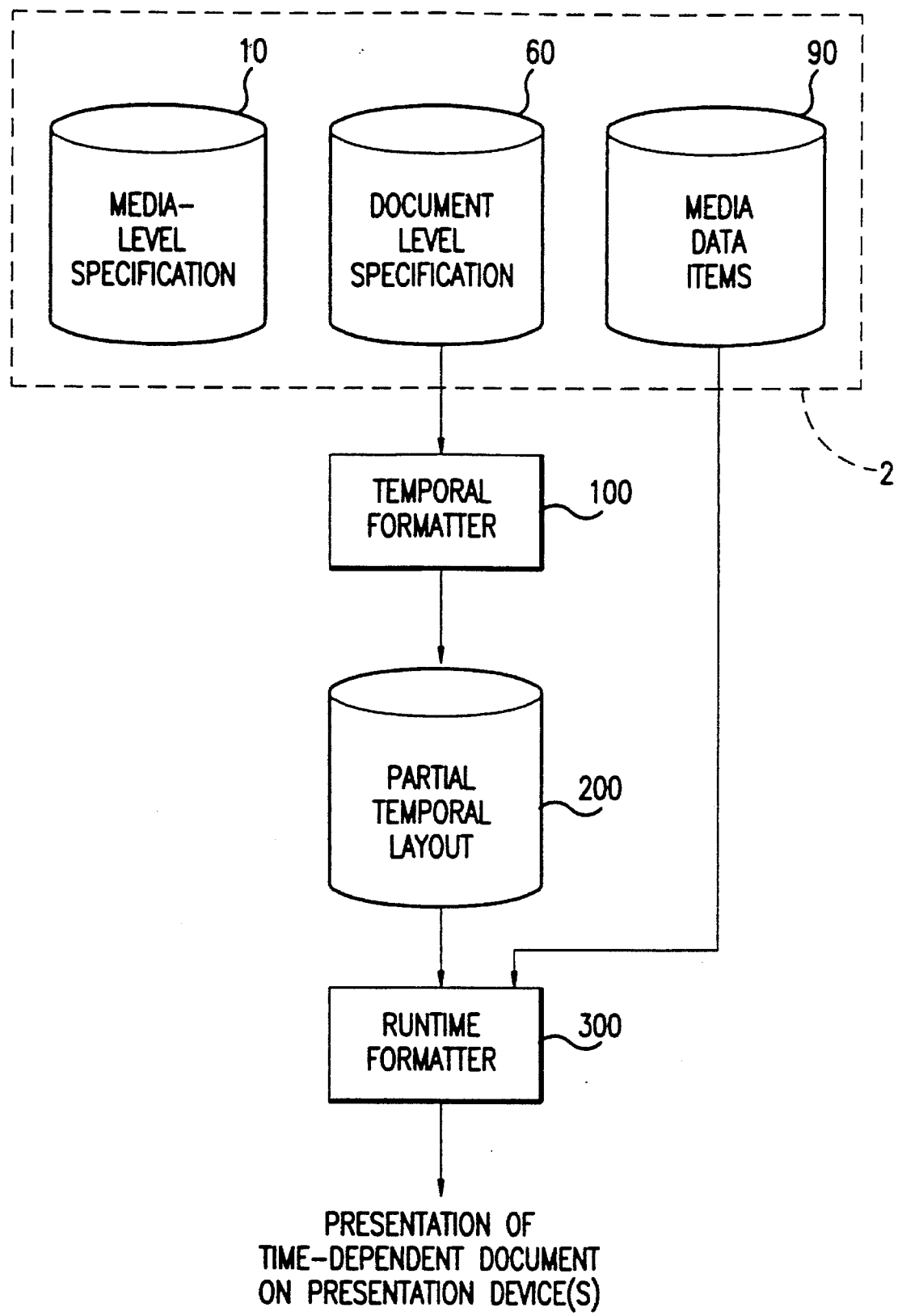
FIG. 1 is a block diagram schematically illustrating a general overview of the process and data flows of the present invention.

While the present invention will be hereinafter described in connection with an illustrated embodiment, it will be understood that it is not intended to limit the invention to that embodiment. On the contrary, it is intended to cover all alternatives, modifications and equivalents as may be included within the scope of the invention as defined by the appended claims.

DETAILED DESCRIPTION OF THE ILLUSTRATED EMBODIMENT

Table 1: Detailed Description Table of Contents

A. Conceptual framework of a multimedia document and a multimedia information presentation system.

B. Description of an illustrated embodiment of the method of the present invention.
  1. The temporal specification data structures that are the input to the method of the present invention.
     a. The media-level specification.
     b. The document-level specification.
  2. An exemplary time-dependent document and the user interface of the authoring subsystem.
  3. The schedule data structures that are produced by the method of the present invention.
  4. The temporal formatting method of the present invention.
     a. The linear programming implementation.
     b. An alternative implementation.
  5. The runtime component of the temporal formatter.

C. The system environment and system configuration of the present invention.

D. References.

E. Miscellaneous considerations and conclusion

A. Conceptual framework of a multimedia document and a multimedia information presentation system.

The present invention relates to method steps for operating a system including a processor, and to processing electrical or other physical signals to produce other desired physical signals. The detailed descriptions which follow are presented largely in terms of display images and sounds, and symbolic representations of operations of data within the memory of the system. These descriptions and representations, which are algorithmic in nature, are the techniques used by those skilled in the data processing arts to most effectively convey the substance of their work to others skilled in the art. An algorithm is here, and generally, conceived to be a self consistent sequence of acts leading to a desired result. These acts are those requiring physical manipulations of physical quantities such as electrical or magnetic signals that are capable of being stored, transferred, combined, compared, and otherwise manipulated. It proves convenient at times, principally for reasons of common usage, to refer to these signals by a variety of terms, including bits, values, elements, pixels, symbols, characters, terms, numbers, data items, or the like. However, all of these terms and the additional terms defined below are convenient labels applied to appropriate physical quantities.

Further, the manipulations performed are often referred to in terms, such as adding, comparing, or determining, which are commonly associated with mental operations performed by a human user. Apart from supplying certain signals to the system that the method operates, the capability of a human user is neither necessary nor desirable in the operations described herein which form part of the automatic temporal formatting method of the present invention. In addition, the algorithmic descriptions presented herein of the acts of the present invention are not inherently related to any particular processor, system, or other apparatus. Useful systems for performing the operations of the present invention include general purpose digital computers or other similar devices configured as described below and in the claims.

The present invention also relates to a system for performing these operations. This system may be specially constructed for the required purposes or it may comprise a general purpose computer selectively activated or reconfigured by a computer program stored in the computer. In particular, various general purpose systems may be used with programs in accordance with the teachings herein, or it may prove more convenient to construct more specialized apparatus to perform the required acts of the method. The required structure for a variety of these systems will appear from the description given below.

By way of general background, the term "data" refers herein to physical signals that indicate or include information. The term "data" includes data existing in any physical form, and includes data that are transitory or are being stored or transmitted. For example, data could exist as electromagnetic or other transmitted signals or as signals stored in electronic, magnetic, or other form. An "item of data" or a "data item" is a quantity of data that a processor can access or otherwise operate on as a unit. For example, an eight-bit byte is a data item in many data processing systems. Data can be combined into a "data structure." A "data structure" is any combination of interrelated data. A data structure may also include other data structures. A processor "accesses" an item of data in memory by any operation that retrieves or modifies the item, such as by reading or writing a location in memory that includes the item. An item of data "indicates" a thing, an event, or a characteristic when the item has a value that depends on the existence or occurrence of the thing, event, or characteristic, or on a measure of the thing, event, or characteristic. When an item of data can indicate one of a number of possible alternatives, the item of data has one of a number of "values." For example, when the time data item included in the schedule command data item can specify one of a number of different times a presentation action may take place, the time data item indicates a time value. In addition, a first item of data "indicates" a second item of data when the second item of data can be obtained from the first item of data, when the second item of data can be accessible using the first item of data, when the second item of data can be obtained by decoding the first item of data, or when the first item of data can be an identifier of the second item of data. For example, when the duration data item for two temporally adjacent events in a media description data item is obtainable using the event value indicated by an event data item, the first item of data, the event data item, indicates the second item of data, the duration data item. In another example, when a first item of data includes a pointer or other information related to the location of a second item of data in a memory or other storage medium, the first item of data indicates the second item of data. Thus, in the context of the present invention, when the media pointer data item has a memory address value which the processor can use to locate and access the media data item, the media pointer data item indicates the media data item.

Preliminary to describing the embodiments of the claimed invention illustrated in the accompanying drawings, it is helpful to provide a conceptual framework describing the environment in which the method and system of the present invention operate, and to establish a common base of terminology. The terms described and defined below have the meanings indicated throughout this specification and in the claims.

A multimedia information presentation system is often described as a presentation of information that includes presenting information on different types of output devices, or "media," such as a display device and a speaker, or presenting information that is stored on different types of storage media, such as digital video or audio data stored on digital media, and analog data stored on video tape or audio tape or video disk, or presenting information from diverse sources, such as from a live television broadcast and from a computer memory. The method of the present invention does not use "media" in this manner to necessarily refer to output data presentation signals of different types, although the method may be used to operate a system that includes presentation of information on different output media devices.

The method of the present invention provides a method of automatically temporally formatting the presentation of data components that have temporal relationships among them. These data components may be thought of as a temporally related unit called a "time-dependent document." A "time-dependent document" as used herein is a series of (at least two) discrete sets, or components, of data related in time (e.g., by order of occurrence) and presented to a human user on one or more media presentation devices suitable for presenting the data components in human-perceptible form. The term "series" is intended to include discrete sets of data components that are partially or wholly concurrent in time, as well as those that do not overlap in time and are sequential. A multimedia document defined by at least two discrete sets, or components, of data related in time and presented to a human user on one or more media presentation devices is an example of a time-dependent document. In addition, a hypermedia document is also an example of a time-dependent document.

A discrete set of data in a time-dependent document defines a "media item," and the series of media items that define a time-dependent document may include discrete sets of data defining static and dynamic (e.g., in motion) "images" as well as sounds (also referred to as audio). A static media item, which, in contrast to a dynamic media item, typically does not have an inherent dimension of time associated with its specification, may become part of a time-dependent document when it is specified as being temporally related to another media item, or when it is explicitly specified as having a presentation duration. For example, data components defining each of two static images, such as two photographic slides, each define a static media item, and, if related in time, as for example by order of occurrence, the series of the data components defining the two photographic slides defines a time-dependent document as that term is intended to be used herein. Similarly, data components defining a video image segment and an audio segment respectively are each media items, and if related in time, these data components also define a time-dependent document. A media item may also be defined by any other type of discrete set of data, in addition to those defining images and audio, that may be presented to a user in the form of human-perceptible signals, such as, for example, olfactory data or tactile data. A media item may also include an application program that produces data that may be presented to a user in the form of human-perceptible signals, and may itself be a composite data component including another time-dependent document. A "media item" is distinguishable from a data description about that media item that includes information the temporal formatter of the present invention uses to produce a temporal layout of the time dependent document. The data description about that media item is referred to as a "media description data structure" or a "media-level specification" about a media item.

A time-dependent document and many of the following definitions will generally be described herein in terms of image and sound media items, but the method of the present invention will operate on a time-dependent document composed of any media items related in time by order of occurrence, and so the description of the illustrated embodiment in the context of image and sound media items only is not intended to be limiting to those media items. Moreover, the description of the illustrated embodiment in terms of both image and audio media items is also not intended to require that the method of the present invention operate on time-dependent documents that include media items having different signal types. The method of the present invention will operate successfully on time-dependent documents that include at least two different media items of the same signal type that are related in time by order of occurrence, such as data components defining the temporally related photographic slides, or data components wholly comprised of text data.

The document author explicitly specifies which media items are to be included in the document, and, depending on the authoring system, may be able to specify the starting point and ending point of an entire media item or of a media segment, thereby implicitly editing a subset of the media item for inclusion in the document. Each of the starting and ending points of a media data item or media item segment is called an "event data item," or "event." Articles and texts discussing multimedia systems may also call these points "reference points" or "synchronization points." In addition to starting and ending event data items, a media item may also include additional, specified event data items, each of which is a data item indicating an internal point of the media item between the starting point and the ending point. The degree of specification of event data items in a media item is referred to as the "granularity" of the media item. Existing authoring systems that permit only a reference to starting and ending points in a media item permit the construction of documents including media items having "coarse granularity." Authoring systems that permit authors to reference internal event data items permit the construction of documents including media items having "fine granularity." By way of example, if a media segment is a piece of film footage in a foreign language, the ability to specify internal event data items within the film footage (e.g., actual film frames) permits the temporal relationship of text media segments in the form of subtitles to be specified more easily and with more precision.

Event data items are classified as "predictable events" and "unpredictable events." Predictable events mark times that can be determined in advance under ideal conditions (ignoring unpredictable delays, such as excessive network load). Examples of predictable events include the time at which a specific frame in a video is presented or the time at which a specific sample in an audio recording is played. Unpredictable events mark points in time during the presentation of a media segment that cannot be determined in advance, such as when a program reaches a particular state or when a reader selects an object on the screen.

A media item's "duration," also called a "durational time value" herein, indicates the length of time required to prepare and present a media item. Preparing a media item for presentation may include the time needed for retrieving, compressing, transmitting, and uncompressing the data. A duration for presenting a media item or media segment specifies the length of time between two events in the media item or media segment. Thus, a media item having only starting and end events specified will have a single duration, while a media item having fine granularity may have a duration specified for each data component marked by two adjacent events.

Durations are classified as "predictable" or "unpredictable." A predictable duration is one whose length can be determined in advance. Examples of media items with predictable durations include audio, video, and animations. Typically, the length of a predictable duration is a function of the number of discrete data items and the rate at which a unit of data is presented. A predictable media preparation time includes such time as the time required to spin up video playback heads or to transmit data over a network providing guaranteed throughput. An unpredictable duration is one whose length cannot be determined until the media segment actually ends. Media segments with unpredictable durations include programs with unpredictable execution times, such as database search engines and simulations; and realtime communication, such as telephone conversations and live broadcasts of lectures. Unpredictable media preparation times include those to perform a graphical transformation on an image or to transmit data over a network in which resources cannot be reserved.

With respect to static media items such as text and still images, durations can be imposed on the media item, such as by the document author or a process of the authoring system assigning a duration. For example, a predictable duration could be imposed on an image media segment either by presenting it for a fixed amount of time, say 10 seconds, or by presenting portions of it at a fixed rate, say highlighting 6 regions of the image for 2 minutes each for an overall duration of 12 minutes. An unpredictable duration could be imposed by allowing readers to scroll through the media segment at their own speed.

Support in an authoring system for the ability to manipulate the duration of a media item is critical to the overall quality of the appearance and presentation of a time-dependent document. This is because, when positioning in time two media items that are temporally related, if one or both media items has a range of durations within which it can be acceptably presented, its duration may be adjusted during the temporal formatting process in order to more effectively accommodate the temporal relationship between it and the other media item. A media item whose duration may be adjusted anywhere within a range is said to have a "continuously adjustable" duration. The media-level specification of a continuously adjustable media item specifies a range from which the duration can be selected, and perhaps may include a preferred, or "optimum" duration within that range, which is typically the media item's natural duration. The characteristic of a media item that allows both positioning in time within a range of times, and allows for changing the duration of the media item may be referred to as its "flexibility." The temporal formatting method of the present invention supports the temporal formatting of media items having this characteristic flexibility, as well as media items having fixed durations or have little or no flexibility with respect to positioning in time. As will be described in more detail below, the temporal formatting method of the present invention will initially attempt to place events in time using their optimum durations. For example, a video media segment can specify a range from 5 to 10 seconds, and may have a preferred duration of 10 seconds. The particular behavior used for implementing a continuously adjustable duration will vary with the type of media item, but generally will include such behaviors as modifying the playback rate, discarding or repeating data, or performing an alternative action when there is no more data to present. Selection of any of these behaviors will take into account the behavior's effect on the overall quality of the media item's physical appearance. Within certain ranges, the physical effects of these types of behaviors may not noticeably reduce quality.

Once an authoring system supports the creation of a media item providing flexibility in its duration, the author who performs manual temporal formatting, or an automatic temporal formatter, must understand the trade-offs in selecting one duration above another or in deviating from the duration specified as optimum. Thus, the ability to provide an objective measure, or metric, describing the quality of a particular media segment's presentation, or the expense of generating, transporting, or presenting the media segment, or both, becomes a factor that is important to the overall quality of the appearance and presentation of the time-dependent document. A "flexibility metric" specifying a quality or expense parameter can be used by a formatter to select the "best" representation for each media segment in a given situation. That representation may include selecting an alternative presentation type for the media item, or adjusting the duration of the media item. In the method of the present invention, the flexibility metric permits the scheduler to determine the "best" way to adjust the durations of one or both of first and second temporally adjacent media items within the range of durations specified for each in order to satisfy the specified temporal relationship between the two media items. The "best" solution to adjusting the durations is computed by the system according to metric parameters supplied by the document's author. In the illustrated embodiment of the temporal formatting method of the present invention described in detail in Section B below, the author of the time-dependent document specifies "costs" for each media item. Costs are numerical values that define to the method a penalty for deviating from the optimum duration specified for a media item.

Media item granularity determines how flexibly and precisely two temporally related media items may be positioned in time. The specification of an internal event data item within a media item permits the positioning of that event data item in time with respect to another event data item within the same or within another media item to which it is temporally related.

The temporal formatting and coordination of the at least two media items that define a time-dependent document necessarily involve interpreting the temporal relationship specified between the two media items. The temporal formatting method of the present invention supports the temporal formatting of a time-dependent document that includes media items having an ordering relationship between two specified events each of which is included in a respective media item. Two event data items are "temporally adjacent" when a time ordering relationship between the two events has been specified. The data indicating the ordering relationship between two events is referred to herein as "temporal constraint data." The author of the time-dependent document may specify a temporal ordering relationship between media items at the events marked by event data items. An event data item can identify a range of things: an absolute time, a relative time during the document's presentation (i.e., 10 seconds after the start of the document, halfway through a media item); a predictable or unpredictable event in a media item; an external event that can be passed through to the system (i.e., user interaction); or a composite event data item, which is any temporal relationship that produces a specific point in time. Ordering relations are binary relations that specify the order of occurrence of event data items in the time-dependent document. Examples of ordering relations include "simultaneous with" and "before by 10 seconds." These parameters may be temporal equalities, such as 10 seconds; temporal inequalities, such as less than 10 seconds; or temporal ranges, such as between 10 seconds and 1 minute. The present invention uses the specified temporal relationships to assign times to events by positioning media segments, and then adjusting temporal relationships or durations of media segments within specified ranges. Note that, in the example above of the static media item with predictable duration defined by highlighting 6 regions of the image for 2 minutes each for an overall duration of 12 minutes, when the presentation of one of the six highlighted regions is temporally related to a prior-presented one of highlighted regions of the image, the two temporally related presentations of the highlighted regions describe first and second temporally adjacent media items for purposes of the present invention.

A "schedule data structure" produced by the present invention and indicates timing and operation information that controls the presentation of the time-dependent document. This timing and operation information is referred to herein as the document's "temporal layout." Other references may call this information a document's "schedule." The schedule data structure includes a plurality of "schedule command data structures," or "commands," each of which indicates information necessary for controlling the presentation of a media item. Each schedule command data structure contains at least a time data item indicating a time value, an event data item, specifying the event to which the time value is associated, and a reference to the media item that includes the event. When the event time values satisfy the specified temporal relationships among media segments, a temporal layout is "consistent." Otherwise, the temporal layout contains "temporal mismatches." When a temporal layout is consistent and its environment requirements are satisfied (e.g., the specified presentation devices are available), the temporal layout is "presentable." The automatic temporal formatting method of the present invention produces a consistent temporal layout, detecting unsatisfiable and uncorrectable temporal mismatches during a compile-time phase, before the document is actually presented. Such mismatches are flagged as errors in the temporal specification.

The automatic temporal formatting method of the present invention processes, as input, media items that have both "predictable behavior" and "unpredictable behavior." The term "predictable behavior" refers to a media item that has both a predictable duration and that includes only predictable events. The term "unpredictable behavior" refers to a media item that has either an unpredictable duration, or that includes an unpredictable event, or both. In particular with respect to media items having unpredictable behavior, the automatic temporal formatting method of the present invention handles media items having content-based unpredictable behavior, which includes program states and user interaction with the content of the document. Content-based unpredictable behavior is made explicit in the temporal specification that is prepared by the author of the time-dependent document. The temporal formatting of content-based unpredictable behavior increases the expressiveness of the resulting document.

A "partial temporal layout" is one in which media items having predictable behavior are formatted, but media items having unpredictable behavior are not completely formatted by the temporal formatter. When the method of the present invention processes media items having both predictable and unpredictable behavior as input, the method produces, during a compiletime phase, a schedule data structure called the "main schedule data structure," or simply the "main schedule," which includes times assigned to events having predictable behavior, and a schedule data structure called an "auxiliary schedule data structure," or simply the "auxiliary schedule" for each event having unpredictable behavior. An event data item in the main schedule indicates the auxiliary schedule data structure for a temporally adjacent event data item for which a time cannot be assigned. These data structures are described in more detail below in the discussion accompanying FIG. 4. During the runtime phase of the method, events that have only been partially temporally formatted in advance (i.e., unpredictable events) are completely formatted by "presentation" and "event handler" runtime subsystems. These are described in more detail below, in the discussion accompanying FIG. 8.

The temporal formatting and coordination of the at least two media items that define a time-dependent document may also include specifying and adjusting one or more media item behaviors, or "operations," that a document author has specified for a media item, where an authoring system supports such specification. An operation is a one or more instructions that are able to be interpreted by the media manager responsible for controlling the presentation of media items of the same type. Operation specification allows authors to impose behavior on an event, much as different appearances, such as bold or italic, can be applied to characters or paragraphs in spatial document formatting systems. Authors may wish to add behaviors to individual events, such as sending messages to other media segments; individual intervals, such as zooming in on a portion of an image; or to groups of intervals, such as setting the volume of all audio media segments to a certain level. The result of an operation can be time-altering, such as "increase playback speed" or "pause 10 seconds," or it can be non-time-altering, such as "start" and "increase volume."

Time-altering operations affect the durations of media item, and, as a result, a temporal formatter must account for time-altering operations when producing the temporal layout of a time-dependent document. The method of the present invention accounts for time-altering operations by determining what effect the time-altering operation has on a media item duration. The schedule data structure produced by the method of the present invention includes an operation data item indicating an "event presentation operation" to take place at the time value indicated by the time data item. An "event presentation operation" is an operation associated with an event included in that media item, to control that media item's or event's presentation behavior. Event presentation operations include the behavior operations specified by the author or by the system, which are carried over from the temporal specification into the schedule data structure, and event behavior operations produced by the method as a result of adjustments made to event durations during the temporal formatting process. An example of the latter type of event presentation operation is described in the discussion below of the illustrated embodiment of the method. A "media manager" is an application that is capable of performing or executing the event presentation operations for a specific type of media item, such as, for example, an application that executes event presentation operations controlling a video or audio tape recorder.

The discrete set of data defining a media item may be comprised of an "output definition data structure" including sufficient information to directly produce output in human perceptible form, such as an image by presenting the image on a display, or such as a sound by presenting the sound through a loudspeaker. In the case of image data, for example, data defining an image may be referred to as "image definition data." A two-dimensional array is an image definition data structure that can define all or any part of an image, with each item of data in the array providing a value indicating the color of a respective location of the image. Each such image location is typically called a "pixel", and the two-dimensional array of data is typically called "image pixel data" or an "image pixel data structure," each item of data in the array providing a value, called a "pixel value", indicating the color of an image location. While image pixel data is the most common type of image definition data, other image definitions, such as vector list data, are intended to be included within the meaning of data defining an image. The discrete set of data defining a media item may alternatively be comprised of a data structure and an operation for operating on that data structure. An operation "produces" a display feature or object in an image or a sound in a set of audio signals when the operation begins without the data defining the image display feature or sound, and performing the operation results in the data defining the image display feature or sound.

As used herein, an "image" is a pattern of light. An image may include characters, words, and text as well as other features such as graphics. An image may be divided into image "segments," each of which is itself an image. A segment of an image may be of any size up to and including the whole image. The term "display feature" refers to any human perception produced by a display in a processor-based system. A "display object" or "object" is a display feature that is perceptible as a coherent unity. A display object "includes" a display feature if presentation of the display object can produce perception of the display feature. An image "includes" a display feature or object if presentation of the image can produce perception of the feature or object. For example, in FIG. 3, graphical representation 400 of the exemplary time-dependent document is an image that includes labeled, directed arcs 446 and 442.

Static image media items may include, but are not limited to, still video, graphic or photographic images, and images of portions or pages of characters, also referred to as text, such as, for example, conventional documents, spreadsheets, musical scores, subtitles, and data base query results. Dynamic image media items may include, but are not limited to, digital video, live motion video, video special effects, simulations, animations and realtime or recorded broadcast images, such as video images received from a television broadcast.

A sound is a pattern of auditory signals. An audio media item may be composed of, but is not limited to, digitally sampled audio signals stored in a memory, audio signals generated by a digital signal processor, audio signal data for use in controlling external synthesizers and an audio tape recorder or the playing of audio from a VCR, and realtime or recorded broadcast audio signal data, such as signals received from radio and television broadcasts.

A "media presentation device" is a presentation device that can provide a discrete set of data included in a time-dependent document in a human-perceptible form. A "display device," or "display" is a media presentation device that provides information in visual form in the form of images. A display may, for example, include a cathode ray tube; an array of light emitting, reflecting, or absorbing elements; a device or structure that presents marks on paper or another marking-receptive medium; or any other device or structure capable of defining an image in a visible form. To "present" an image on a display is to operate the display so that a user can perceive the image. A "display area" is the portion of the display in which an image is presented or the medium which receives an image. A loudspeaker, or speaker, is an example of a media presentation device that provides information in human auditory form. Similarly, to "present" audio media on a speaker is to operate the speaker so that a user can perceive the sound.

Additional information with respect to general concepts about time-dependent documents may be found in [Buchanan 1993] at Sections 2 ("Issues and Requirements . . . ") and 3 ("Automatic Temporal Formatters . . . ") of that document, which sections are hereby incorporated by reference. To the extent that any information in that portion of [Buchanan 1993] conflicts with statements herein about the present invention, the discussion herein is controlling. With this conceptual framework of the automatic temporal formatting method and system of the present invention in mind, the description of an illustrated embodiment of the present invention now follows.

B. Description of an illustrated embodiment of the method of the present invention.

1. The temporal specification data structures that are the input to the method of the present invention.

FIG. 1 illustrates a general overview of the process and data flows of the present invention. In the illustrated embodiment, the author of a time-dependent document creates or identifies the individual media items 90 of the document and then specifies a temporal relationship among them that is to control the presentation of the document to the reader. These temporal relationships are captured in one or more data structures 10 and 60 which, together with the media items

90, are known collectively as the "temporal specification" 2 of the time-dependent document. The automatic temporal formatting method 100 of the present invention then uses data items in the temporal specification 2 to produce the partial temporal layout 200, also referred to as the schedule data structure, which indicates all or part of the temporal layout of the presentation of the time-dependent document. In a further process, the partial temporal layout 200 is input to a runtime operation 300 which completes the final temporal layout needed for presentation and controls the actual presentation of the data in the document.

Figure 2:
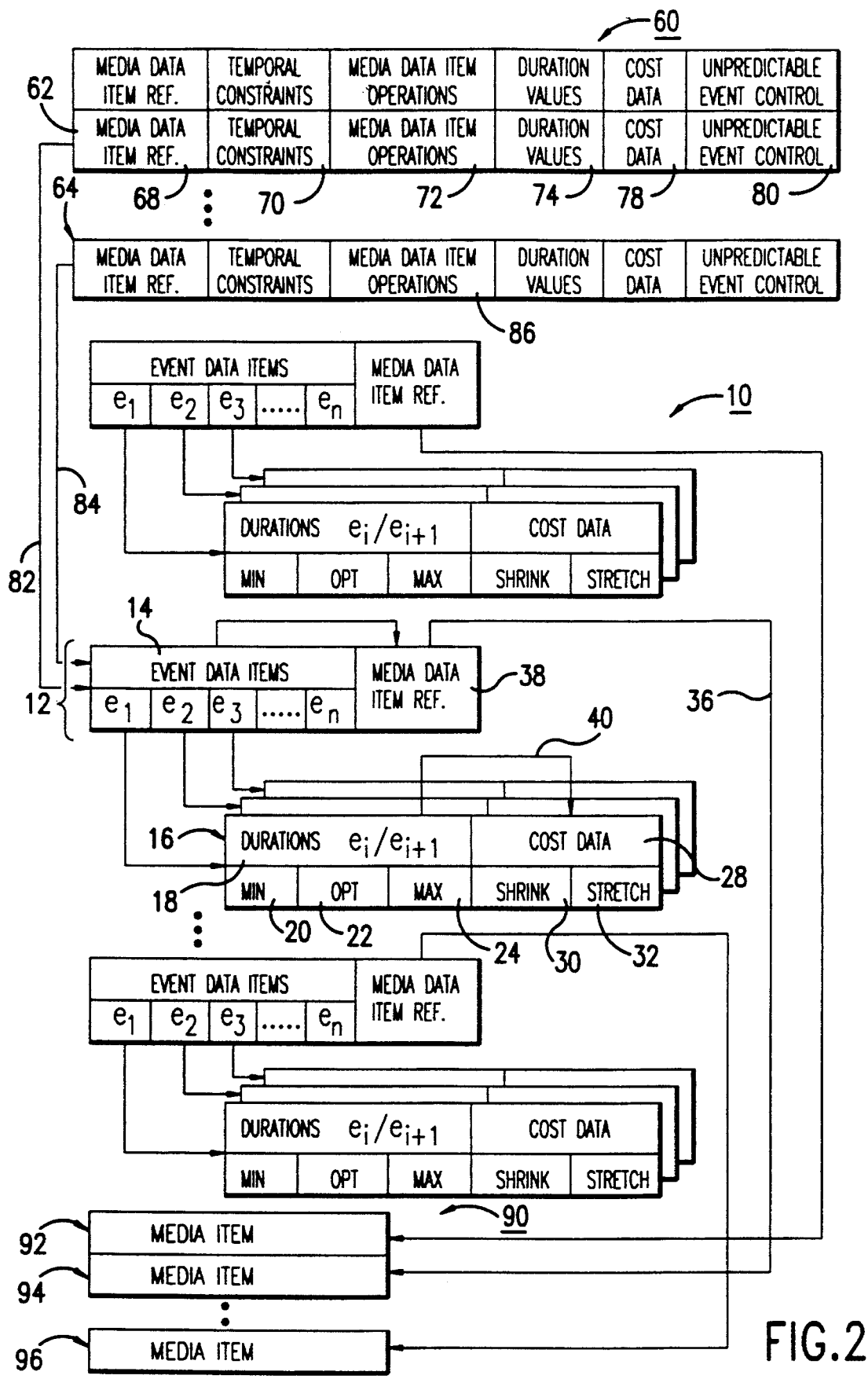
FIG. 2 is a diagram illustrating the data structures that are the input to the illustrated embodiment of the method of the present invention.

FIG. 2 illustrates the components of the temporal specification 2 that is the input to the illustrated embodiment of temporal formatting method 100. Temporal specification 2 used by the present invention includes three data structures: a media-level specification called a media specification data structure 10, which describes the temporal behavior of individual media items in the document; a document-level specification called a document specification data structure 60, which describes the temporal behavior of the document as a whole; and the media items 90 that include the data from which the human-perceptible signals of the document, such as video or text images or sounds, are produced. Separating the temporal specification into these multiple levels supports facilitates reuse of media items in the same documents or in different documents. Note that in the present invention, the data structures are not limited to a combination of data items physically located in a substantially contiguous part of a system's memory, but may include individual data items diversely located in one or more local or remote memories and accessible by the system processor when it performs the operations of the method. Note also that the connecting lines and arrows in FIGS. 1 and 4, such as connecting line 82 in FIG. 2, illustrate the concept that a first data item "indicates" a second data item, in accordance with the definition provided above of "indicates." The connection between the data items may be implemented using pointers or other linking mechanisms, or by defining the data structures in memory to the method, or in any other manner that accomplishes this connection.

a. The media-level specification.

The media-level specification describes the temporal behavior of each of the media items 90 that are included in a time-dependent document, such as video clips, audio recordings, text files, programs, or other time-dependent documents. The media specification data structure 10 includes a media description data structure 12 indicating information describing each single media item included in the document. Each media description data structure 12 includes media item reference data 38 that indicates the respective media item 94 described by media description data structure 12. Each media description data structure 12 also includes event data items 14, each of which marks a point in time during the presentation of the respective media item. For example, each media description data structure 12 may include start ($e_1$) and end ($e_n$) event data items that indicate respectively the start and end of the presentation of the respective media item, as specified by the author. In the illustrated embodiment, each media description data structure 12 also includes zero or more internal event data items ($e_i$) between the start and end events, as specified by the author of the document. These internal events may then be temporally related to events specified in other media items. Event data items may indicate predictable or unpredictable events. Unpredictable events can be activated or deactivated by the author at any event, which allows authors to control when unpredictable events can affect the document's behavior.

With continued reference to FIG. 2 and media description data structure 12, each event data item indicates a data item 16 that includes information about two temporally adjacent events in the same media item, referred to herein as $e_i$ and $e_{i+1}$. Duration data item 18 indicates the elapsed durational time value between $e_i$ and $e_{i+1}$; in the illustrated embodiment, this durational time value is represented by three time values: a minimum time value 20 which is a minimally acceptable elapsed time of the media item between $e_i$ and $e_{i+1}$; an optimum time value 22 which is the natural or actual elapsed time of the media item between $e_i$ and $e_{i+1}$; and a maximum time value 24 of the media item between $e_i$ and $e_{i+1}$.

The temporal formatting method of the present invention handles the temporal formatting of durational time values that are both predictable and unpredictable. For predictable durations, the minimum, optimum, and maximum durations are either nonnegative real numbers or the value "unspecified." To specify a duration of a fixed length, the author specifies the minimum, optimum, and maximum durational time values as being equal to a single nonnegative real number. To specify a duration of adjustable length, the author specifies different nonnegative real numbers as durational time values which indicate that the duration is adjustable to any value within the range specified by the minimum and maximum durations. The author specifies an unpredictable duration by assigning the value "unpredictable" to the minimum, optimum, and maximum durations.

In the present invention, each media description data structure 12 indicating information describing a media item in the document includes flexibility metric data 28 which relates to the presentation quality of the respective media item described by media description data structure 12. Flexibility metric data 28 is an objective measure specified by the author of the media item's ability to be flexibly positioned in time or to have a flexible duration, or both. The flexibility metric may simply be a binary value indicating whether or not the media item is required to be positioned in time or is optional, or the flexibility metric may represent a more complex specification of media item flexibility, such as described below in the illustrated embodiment. For example, the flexibility metric could provide an objective measure indicating how to select from a range of time values in a temporal constraint. The flexibility metric is then used by temporal formatter 100 to make media item positioning and duration decisions during the production of the temporal layout of the document.

In the illustrated embodiment, flexibility metric data 28 is related to each duration data item 18 indicating the elapsed durational time value between two temporally adjacent events, $e_i$ and $e_{i+1}$, and is referred to as duration-adjustment cost data 28, which are associated with adjustable durational time values for temporally adjacent events to give preference, or priority, levels to the durational time values in the range between minimum durational time value 20 and maximum durational time value 24 currently computed. Media items having unpredictable durations have durations specified as "unpredictable", and events are flagged to identify which events are starting and ending events. The list of predictable internal events is maintained in increasing temporal order, and the list of unpredictable internal events are arranged in order of creation. A document author specifies duration-adjustment cost data for each duration data item 18 that indicates to temporal formatting method 100 the penalty for selecting a duration other than the optimum. Selecting an elapsed time for two temporally adjacent events that is different from optimum durational time value 22 typically reduces the presentation quality of the media item that includes those events, and costs can be viewed as an objective measure of this degradation. Each duration data item 18 indicates, via arrow 40, two separate cost data items 30 and 32, specified as nonnegative real numbers. Cost shrink$_{i,i+1}$ data item 30 has a value for the cost of reducing, or shrinking, the duration of temporally adjacent events $e_i$ and $e_{i+1}$ when a value greater than or equal to the minimum and less than the optimum durational time value is selected by temporal formatter 100. Cost stretch$_{i,i+1}$ data item 32 has a value for the cost of expanding, or stretching, the duration of temporally adjacent events $e_i$ and $e_{i+1}$ when a value greater than the optimum and less than or equal to the maximum durational time value is selected by temporal formatter 100.

b. The document-level specification.

The document-level specification describes the temporal behavior of the document as a unit. The document specification data structure 60 includes a document description data structure 62 indicating information at the document level describing each media item included in the document. Each document description data structure 62 includes media item reference data 68 that indicates the respective media description data structure 12 in media specification data structure 10 of the media-level specification. A single media item may appear in multiple documents or repeatedly in a single document. Each appearance of a media item is referred to as an "instance" of that media item, and all instances of a media item in either the same document or in multiple documents share the information in the media-level specification. For example, document description data structure 64 also indicates media description data structure 12 in media specification data structure 10, thereby representing that media item 94 is repeated in the document represented by document specification data structure 60.

Each document description data structure 62 also includes temporal constraint data 70 indicating time ordering relationships among events in the document. Temporal constraints explicitly represent the temporal relationships among events in the document by specifying the temporal ordering of pairs of events in one or more media items. Each temporal constraint is directed from a source event, $e_{src}$, to a destination event, $e_{dest}$. Temporal constraints are specified by the author. There are two classes of temporal constraints: temporal equalities, such as requiring that two events $e_{src}$ and $e_{dest}$ occur simultaneously, or that $e_{src}$ precede $e_{dest}$ by a fixed length of time; and temporal inequalities, such as requiring that $e_{src}$ precede $e_{dest}$ by some unspecified duration, that $e_{src}$ precede $e_{dest}$ by at least 15 seconds, or that $e_{src}$ precede $e_{dest}$ by at least 10 and no more than 20 seconds. Table 2 below lists the temporal constraints supported by the illustrated embodiment of temporal formatter 100. Column 2 in Table 2 provides the mathematical representation used by temporal formatter 100 to express the constraint.

TABLE 2

Temporal Constraints

| Ordering Relationship | Mathematical Representation |
|---|---|
| Simultaneous with | $time_{dest} - time_{src} = 0.0$ |
| Before by t | $time_{dest} - time_{src} = t$ |
| Before by at least t | $time_{dest} - time_{src} \geq t$ |
| before by no more than s | $time_{dest} - time_{src} \leq s$ |
| before by at least t and no more than s | $time_{dest} - time_{src} \geq t$ |
| | $time_{dest} - time_{src} \leq s$ |

Each document description data structure 62 also includes media data operations data 72 indicating operations specified by the document author associated with an event data item to control that media item's presentation behavior. Specifying operations at the document level, rather than at the media specification level, allows authors to control individual instances of a media item differently. Thus, for example, the presentation of media item 94 may differ each time it is presented in the document represented by document specification data structure 60 because the operations included in media data operations data 86 in document description data structure 64 may be different from the operations included in media data operations data 72 in document description data structure 62, even though they both indicate media description data structure 12 representing media item 94.

Durations and flexibility metrics could also be maintained at the document level, represented as document-level duration data item 74 and document-level flexibility metric data item 78 in document description data structure 62. The duration and flexibility metric would be specified in exactly the same manner as those at the media specification level described above. However, the duration and flexibility metric specified at the document level would be associated with specific instances of a media item, allowing the author to tailor the behavior of each instance of the media item separately.

Finally, document specification data structure 60 could also capture information indicating the activation and deactivation of unpredictable events, as specified by the document author at the document level, in unpredictable event control data 80. As a result, unpredictable events in different instances of a media item could be activated and deactivated separately, and events could activate and deactivate unpredictable events in other media items.

2. An exemplary time-dependent document and the user interface of the authoring subsystem.

An illustrated embodiment of the method and system of the present invention will be described with respect to an exemplary time-dependent document that was actually created and for which a temporal layout was actually produced according to the present invention. The exemplary document describes a physics lecture consisting of a stored lecture on electricity and magnetism, and a realtime audio connection to one or more related lectures that take place while the reader is viewing the document.

Figure 3:
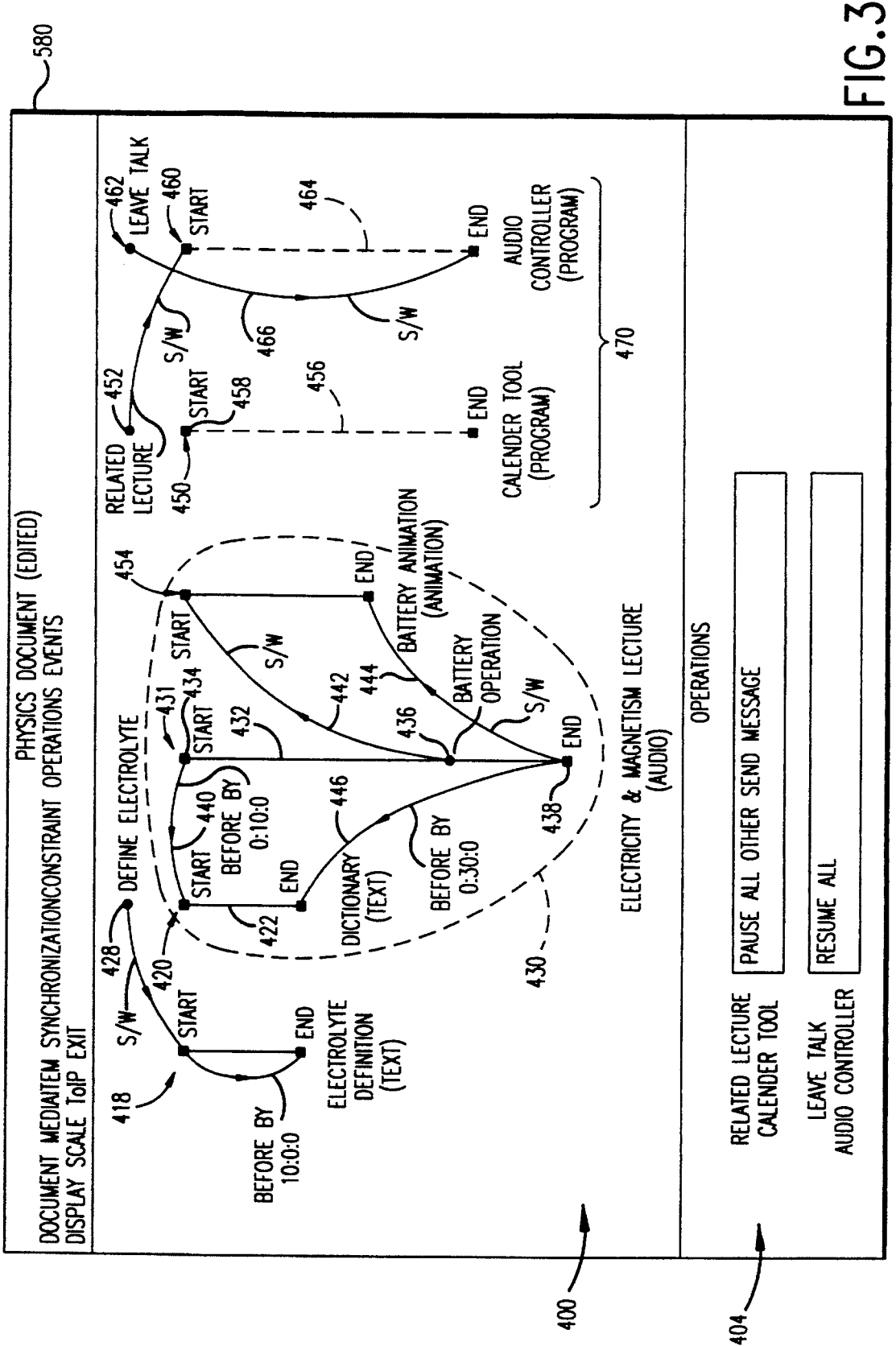
FIG. 3 illustrates the schematic graphical representation of a time-dependent document as produced by the authoring subsystem which uses the method of the present invention.
Figure 9:
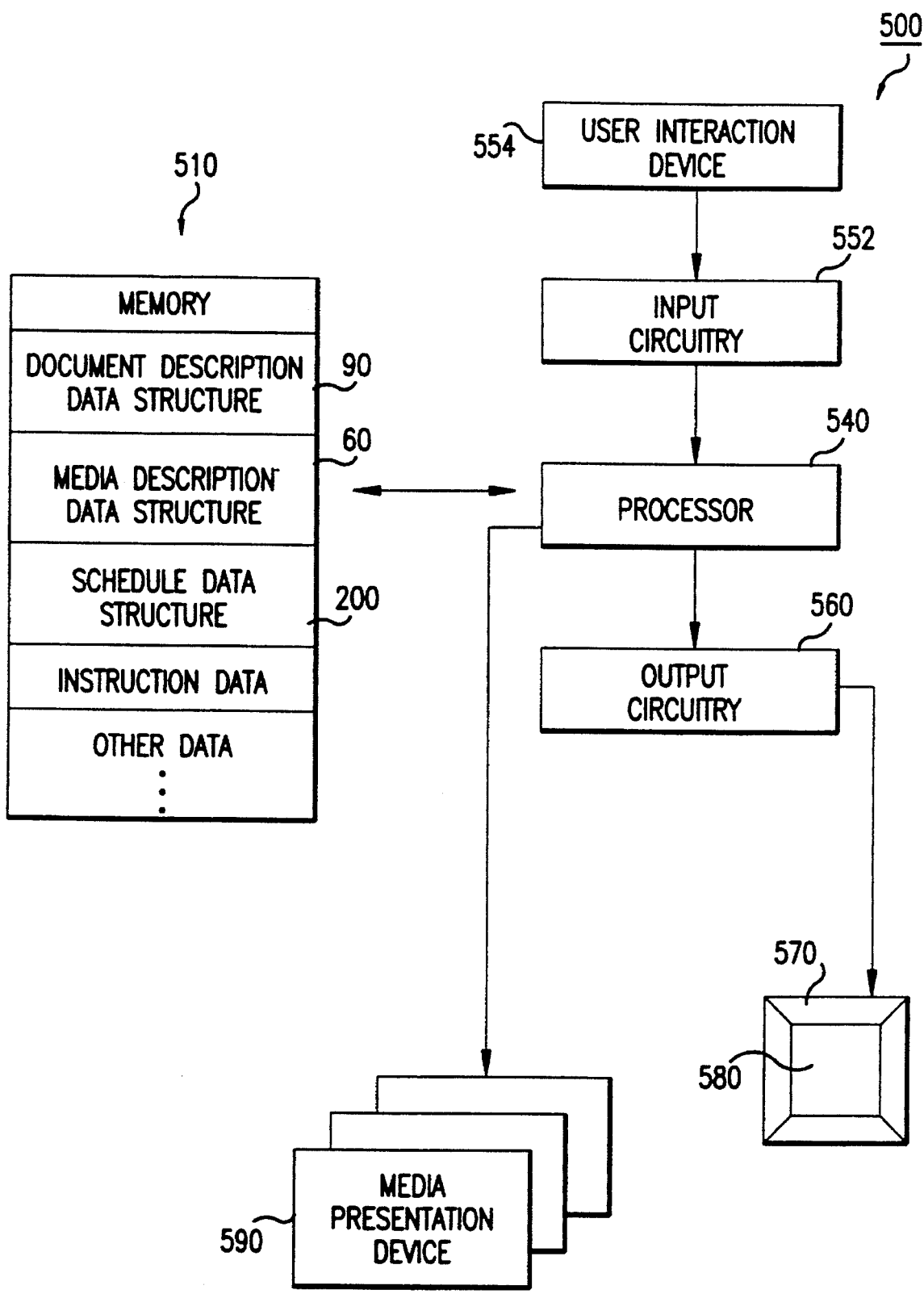
FIG. 9 is a simplified block diagram illustrating the system environment in which the method of the present invention may be used, and the system configuration of the system of the present invention.

The authoring subsystem of the system of the present invention provides a user interface, illustrated in FIG. 3, for representing the exemplary document to the author in a schematic, graphical representation 400 in display area 580 of a display device 570 (FIG. 9). The authoring subsystem provides two direct manipulation authoring tools for creating and editing temporal specifications: a temporal view of a media item, and an interactive document editor, which is shown in FIG. 3. Authors use the editors provided by the media managers to create and edit media items and to mark internal events within them. In response to the author's actions in a media editor, the authoring subsystem creates the graphic representation of the temporal view of a media item, as illustrated in FIG. 3. Authors use the authoring subsystem's interactive document editor to create the document-level specification from which the temporal specification of a time-dependent document is created. The document editor supports adding media items to a document, placing temporal constraints between events to specify their temporal ordering, and adding lists of operations to events to control the presentation behavior of a media item.

The concept of time runs vertically in graphical representation 400, from the top of display area 580 to the bottom.

The stored physics lecture is represented by the graphical representation within dotted lines 430, and contains several media items: an audio recording 431 of the lecture, an animation 454 showing the operation of a battery, and a hypertext dictionary of relevant terminology, shown as media item 420. This dictionary is presented as a text index of terms. When the reader selects a term with a pointing device such as a mouse, the definition of that term is presented. Each media item, such as the audio electricity and magnetism lecture 431, is displayed vertically and has its own timeline 432, based on the optimum durations between its events. Graph nodes represent events in media items: square nodes represent start and end events, and circular nodes represent internal events. Graphical representation 400 shows that audio electricity and magnetism lecture 431 has a total of three events: start event 434, end event 438, and internal event 436. Media item operations are displayed in a separate window 404 in response to a request from the author for such a display.

Temporal constraints between events are represented as labeled, directed arcs between the source and destination events. Graphical representation 400 shows that the author has specified four temporal constraints for electricity and magnetism lecture 430. The directed arc representing temporal constraint 440 is labeled with "before by 0:10:0" and indicates that the start of the audio electricity and magnetism lecture 431 should precede the start of Dictionary media item 420 by 10 seconds; thus, the hypertext dictionary appears 10 seconds after the lecture starts. The battery animation is presented while the lecture describes how batteries operate. The directed arc representing temporal constraint 442 is labeled with "S/W" meaning "simultaneous with" and indicates that the occurrence of the internal event Battery Operation 436 inside the electricity and magnetism lecture 431 should be at the same time as the start of battery animation media item 454; the directed arc representing temporal constraint 444 is labeled with "simultaneous with" and indicates that the end of electricity and magnetism lecture 430 should be at the same time as the end of battery animation media item 454. The directed arc representing temporal constraint 446 is labeled with "before by 0:30:0" and indicates that the end of electricity and magnetism lecture 431 should precede the end of Dictionary media item 420 by 30 seconds; thus, the hypertext dictionary disappears 30 seconds after the lecture ends.

Unpredictable behavior is represented in graphical representation 400 in two ways. The realtime audio connection to related lectures, identified by reference numeral 470 in FIG. 3, contains a calendar tool media item 450 that identifies related lectures, and an audio controller media item 460 that manages the audio connections to the lectures. Each of these media items has an unpredictable duration. Calendar tool media item 450 and audio controller media item 460 are shown as having dashed timelines 456 and 464, signifying these unpredictable durations. Unpredictable events are represented as "floating" circular nodes, positioned in graphical representation 400 so as to be vertically aligned with the timeline of its related media item. For example, unpredictable event "Related Lecture" 452 is shown as a circular node positioned above start event 458 and timeline 456 for the Calendar Tool media item 450 which is the source of the unpredictable event. Graphical representation 400 shows that, if a related talk starts while the reader is viewing the physics document, the document system pauses the lecture and opens an audio connection to the appropriate conference room. This connection remains open until the reader explicitly asks to leave the related talk, represented by unpredictable event 462. At that point the audio connection is terminated, represented by directed arc 466, and the stored physics lecture is resumed.

Because graphical representation 400 represents a temporal specification of the document, in contrast to an actual schedule for the document, media items cannot be positioned relative to one another in a meaningful manner until temporal formatter 100 produces a consistent schedule, and in fact, media items triggered by unpredictable events cannot be positioned until runtime. For example, to specify that two events, e.g. events 436 and 454 in FIG. 3, must occur at the same time, the author places a "simultaneous with" temporal constraint, as illustrated by arc 442, between the nodes representing these events. Because temporal formatter 100, rather than the author, is responsible for producing a consistent schedule, the nodes representing these events typically do not line up horizontally in graphical representation 400.

Table 3 below illustrates the media-level specification for the exemplary time-dependent document shown in graphical representation 400 of FIG. 3.

TABLE 3

Physics Lecture Media Level Specification

| Media Item | $Event_s$ | $Event_{s+1}$ | Durations | | | Costs | |
|---|---|---|---|---|---|---|---|
| | | | Min | Opt | Max | Shrink | Stretch |
| Electrolyte Definition | Start | End | 0 | 9 | unspec | 0.75 | 0.25 |
| Dictionary | Start | End | 0 | 9 | unspec | 0.75 | 0.25 |
| Electricity & Magnetism Lecture | Start | Battery Operation | 20 | 20 | 20 | 999 | 999 |
| | Battery Operation | End | 9 | 9 | 9 | 999 | 999 |
| Battery Animation | Start | End | 8 | 16 | 32 | 2 | 2 |
| Calendar Tool | Start | End | unpred | unpred | unpred | none | none |
| Audio Controller | Start | End | unpred | unpred | unpred | none | none |

3. The schedule data structures that are produced by the method of the present invention.

Figure 4:
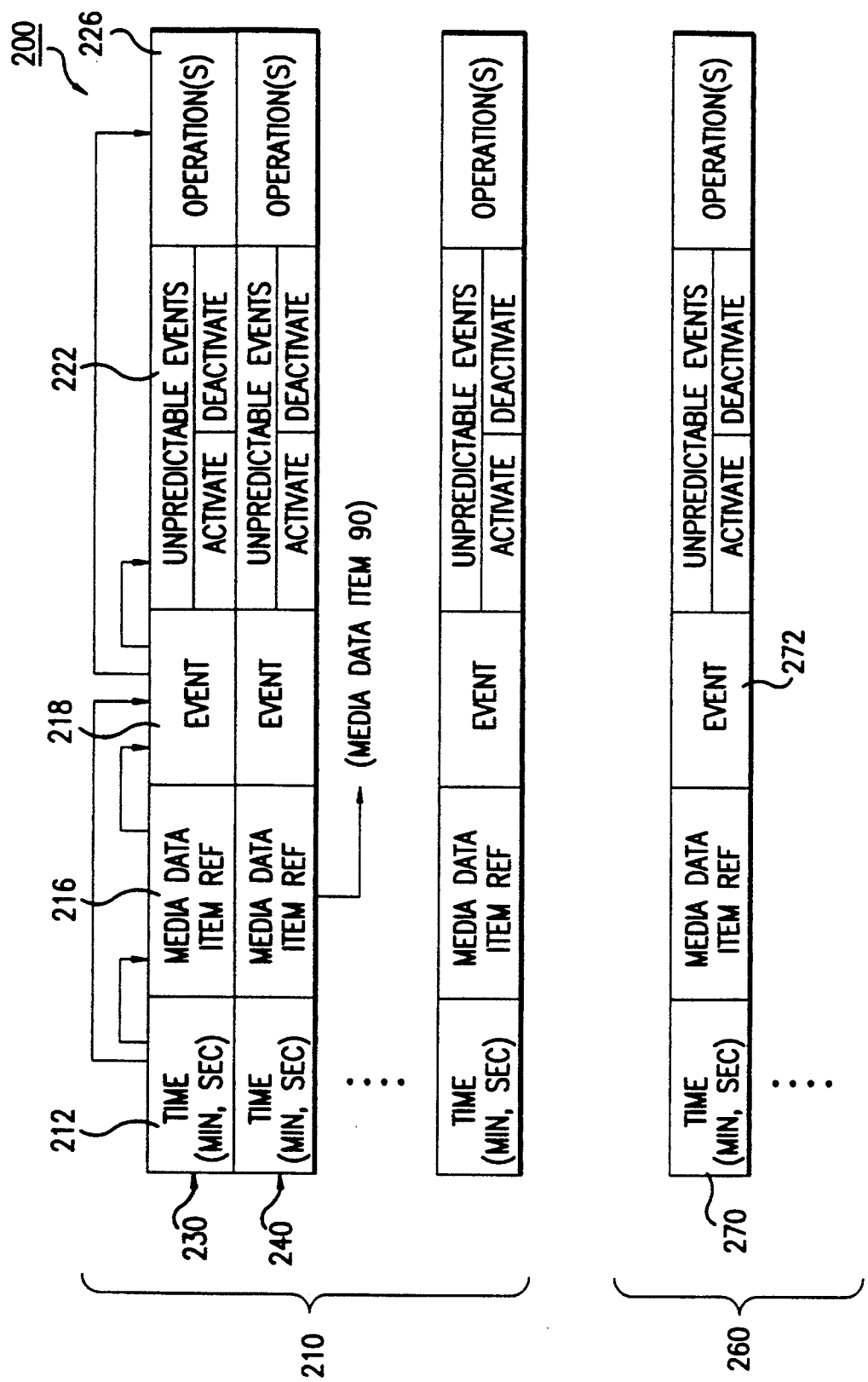
FIG. 4 is a diagram illustrating the main and auxiliary schedule data structures that are the output of the illustrated embodiment of the temporal formatter of the present invention.

The schedule data structures 200 produced by temporal formatter 100 of the present invention are illustrated in FIG. 4 and include a main schedule data structure 210, which includes times assigned to events having predictable behavior, and an auxiliary schedule data structure 260 for each event having unpredictable behavior. Main schedule data structure 210 includes one schedule command data structure 230 for each predictable event in the time-dependent document, as specified in document specification data structure 60 and media specification data structure 10. Auxiliary schedule data structure 260 includes one or more schedule command data structures 270 for each unpredictable event identified in the time-dependent document. If no unpredictable events are identified, temporal formatter 100 does not produce auxiliary schedule data structure 260.

Each schedule command data structure includes information for controlling the presentation of a media item, which will be called a "command," and contains five parts: a time data item 212 specifying when during the presentation of the document the command should be issued; reference data 216 to the media item 90 this command controls; the event data item 218 this command is associated with; list data 222 of the unpredictable events to be activated or deactivated upon the occurrence of the event indicated by event data item 218; and an operation data item 226 indicating the event presentation actions to be executed upon the occurrence of the event.

Runtime formatter 300 (FIG. 1) executes the commands in schedule data structure 200 to present the time-dependent document to a reader.

4. The automatic temporal formatting method of the present invention.

The method and system of the present invention uses a two-phase approach to produce consistent schedules for time-dependent documents. This approach allows for the handling of predictable and unpredictable behavior in a uniform manner. Specifically, temporal formatter 100 uses the temporal specification produced by the document author to produce a main schedule data structure which controls the predictable part of the document; and zero or more auxiliary schedule data structures, which control the portions triggered by unpredictable events. In effect, temporal formatter 100 preprocesses the temporal specification before presentation of the document actually begins. At runtime, runtime formatter 300 recognizes unpredictable events and merges their auxiliary schedules into the executing main schedule to produce the intended temporal behavior for the document. Note that if the time-dependent document contains no media items having unpredictable behavior, the main schedule data structure produced by temporal formatter 100 will have sufficient information to control presentation of the entire document, and runtime formatter 300 will present the document according to the times assigned to events in the main schedule data structure.

Figure 5:
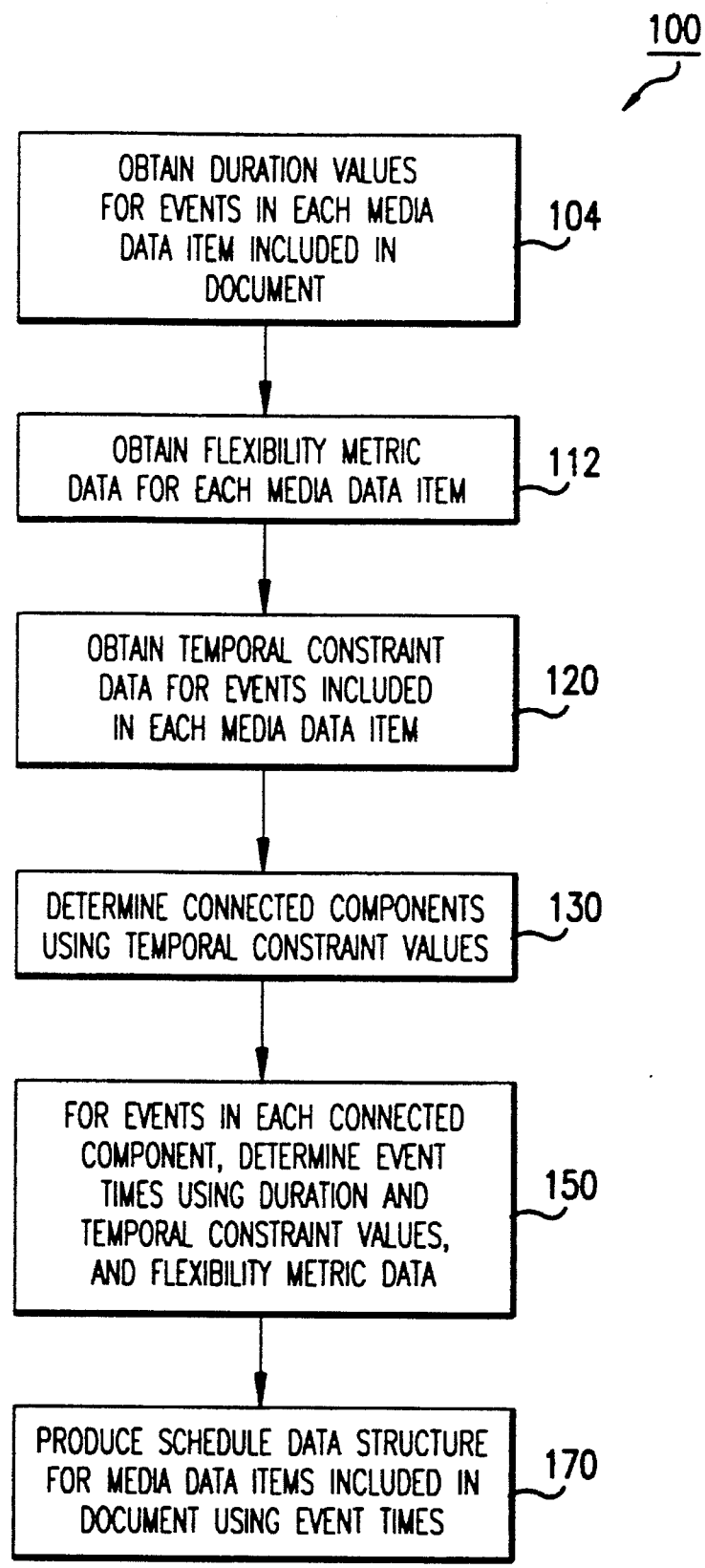
FIG. 5 illustrates the broad steps of the method of the present invention.
Figure 7:
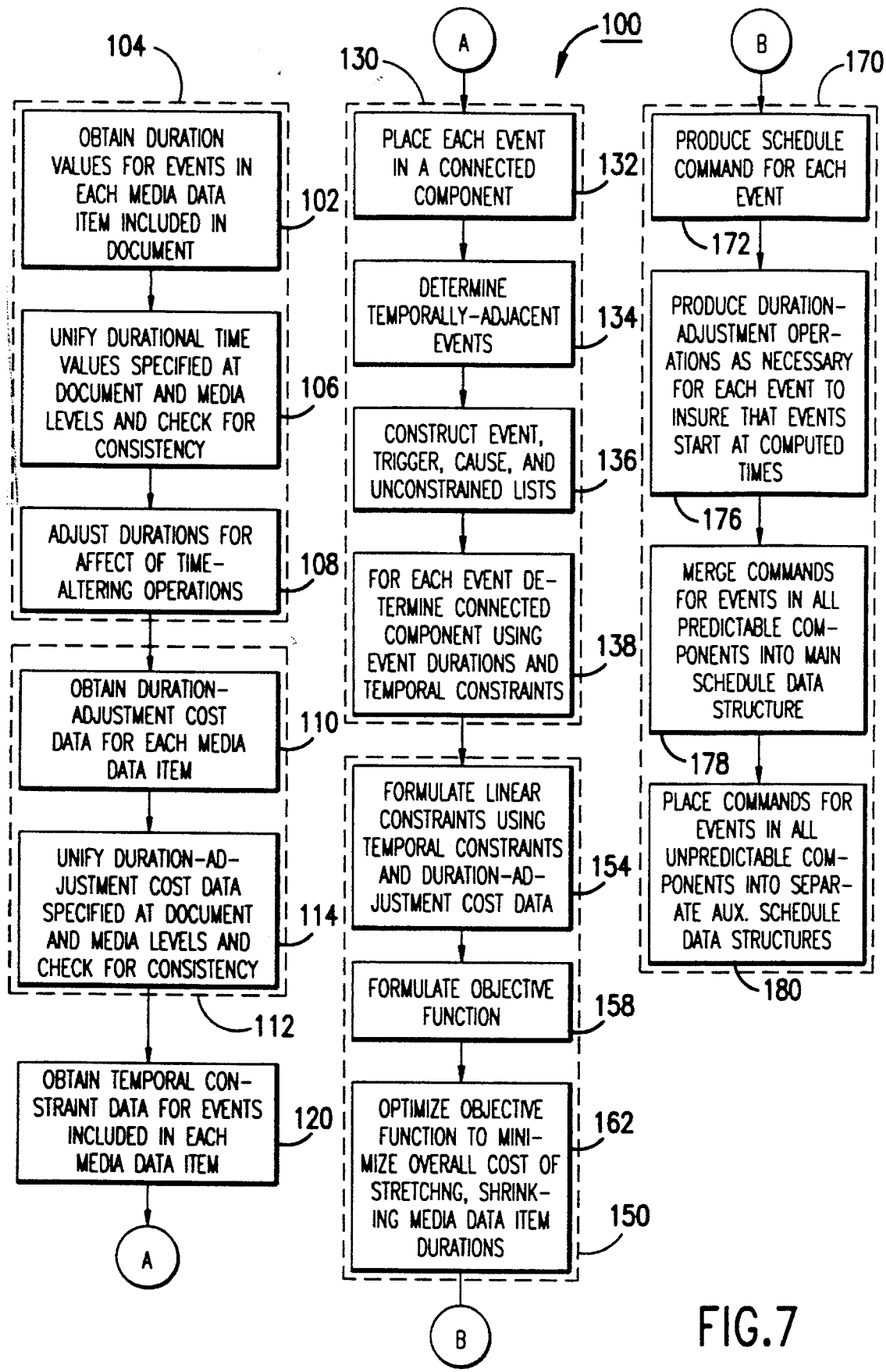
FIG. 7 illustrates the detailed steps of the illustrated embodiment of the present invention.

FIG. 5 illustrates the broad steps of the method 100 of the present invention. Temporal formatter 100 preprocesses a document's temporal specification when a system user (either author or reader) asks the system to present that document. Temporal formatter 100 begins by obtaining the durations and flexibility metric data for each media item from the media-level specification, in boxes 104 and 112, respectively. Next, in box 120, document-level temporal constraint data for events in each media item included in the document are obtained from the document description data structures included in document specification data structure 60. Then, the document's events are partitioned into "connected components," in box 130, using the durations and temporal constraint data. A connected component consists of temporally related events; no known temporal relationships exist between two different connected components. For each connected component, the events are positioned in time by assigning relative times to the events in the connected component, in box 150, using the flexibility metric data, the durational time values for temporally adjacent events, and the temporal constraint data. This positioning may involve adjusting the durations of some of the temporally adjacent events, in accordance with the flexibility metric data. Finally, temporal formatter 100 creates the schedule command data structure for each event that controls the presentation of the media items, in box 170. Each of these steps will now be examined in more detail, with reference to the flow chart of FIG. 7.

a. The linear programming implementation.

In the following description, a knowledge of linear programming is presumed. A useful text in this regard is *Operations Research*, F. S. Hillier and G. J. Lieberman, Holden-Day, San Francisco, 1974. See also, E. Lawler, *Combinatorial Optimization: Networks and Matroids*, Holt, Rinehart and Winston, New York, 1976. In particular, this invention requires the solution of an optimizing minimization problem whose objective function minimizes the overall cost of stretching and shrinking media item durations. Mathematical methods for utilizing a linear programming solution may be found in the cited Hillier and Lieberman reference as well as other linear programming references and are available in software form to enable a computer to realize such functions. With respect to the process of determining connected components described below, suggested union-find algorithms for accomplishing this may be found in Cormen T. H., Leiserson C. E., Rivest R. L., *Introduction to Algorithms*, MIT Press, Cambridge, Mass. and McGraw-Hill Book Co., New York, 1990.

To obtain the durational time values and flexibility metric data, temporal formatter 100 unifies the values specified at the media and document levels in boxes 106 and 114, if document level specifications have been made, and adjusts durations to reflect the presence of time-altering operations, such as "Increase Playback Speed" or "Pause 10 seconds," as illustrated in box 108. If a pair of temporally adjacent events within a single media item have durations and costs specified at both media and document levels, those at the document level are used. However, temporal formatter 100 must check that the document-level durations do not conflict with those specified at the media level. For example, if the media-level duration had a minimum value of 10 seconds, an optimum of 20 seconds, and a maximum of 30 seconds, the document-level duration must specify values between 10 and 30 seconds, such as (1) an adjustable duration with a minimum of 12 seconds, an optimum of 15 seconds, and a maximum of 18 seconds, or (2) a fixed document-level duration of 10 seconds. If values outside this range are specified, the temporal formatter 100 would issue a warning about the erroneous document-level durations. Time-altering operations affect durations. For example, applying an "increase Playback Speed by 2" operation to a media item's start event cuts all of its durations in half. Therefore, temporal formatter 100 checks for time-altering operations, and if they are found, it adjusts the affected durations, or it calls the media manager to adjust the durations.

During the process in box 130, the temporal formatter 100 determines temporally related events by using a union-find algorithm to partition the document into connected components. First, each event is placed in a separate connected component, in box 132. Then, temporally adjacent event durations are determined, in box 134, and, together with the temporal constraints, are examined to determine if they are in a connected component, in box 138. In general, two events are placed in the same connected component if they are connected by a temporal constraint or a duration. However, events connected by unpredictable durations are not merged into the same connected component. For each connected component, temporal formatter 100 maintains four lists, as illustrated in box 136: (1) the event list, which contains all predictable events in the connected component; (2) the trigger list, which contains unpredictable events that appear as source events in temporal constraints, and (3) the caused list, which contains unpredictable events that appear as destination events, and (4) the unconstrained list, which contains unpredictable events that do not appear in any temporal constraints. A connected component is unpredictable if its trigger list is not empty or if its unconstrained list is not empty, and otherwise it is predictable.

Partitioning the temporal specification into connected components simplifies the problem of computing an overall schedule in two ways. First, subsequent steps of temporal formatter 100 operate on each connected component individually, reducing the size of the problem that must be handled. Second, separating a temporal specification into predictable and unpredictable portions allows temporal formatter 100 to generate separate temporal layouts that can be merged together at runtime to produce a consistent schedule for the entire document. The union-find algorithm is roughly linear in the number of durations plus the number of temporal constraints.

Figure 6:
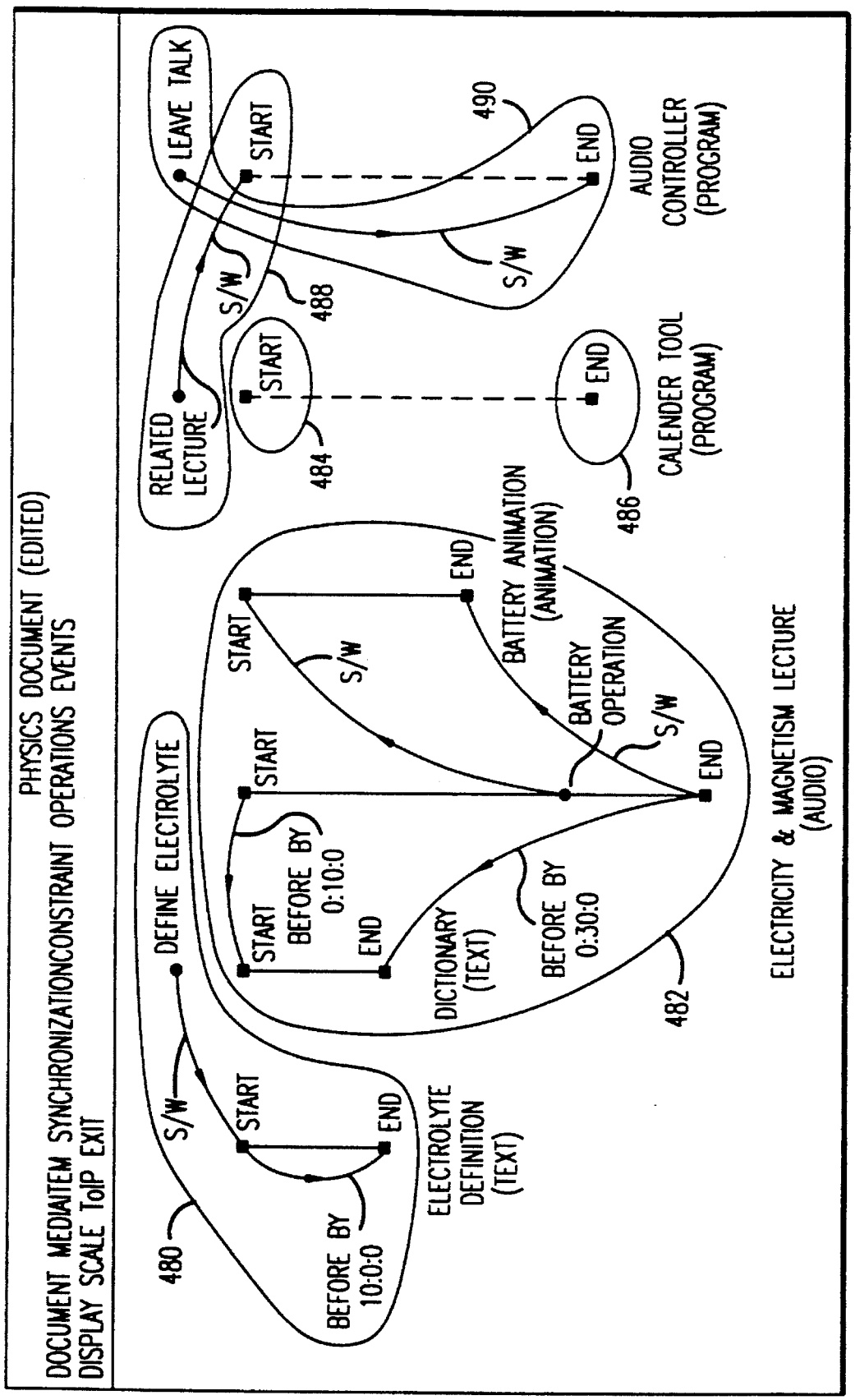
FIG. 6 illustrates the schematic graphical representation of the connected components of the time-dependent document illustrated in FIG. 3, as determined by the method of the present invention.

Returning to the example of the physics lecture document described above and illustrated in FIG. 3, temporal formatter 100 identifies six connected components for the exemplary document. shown in FIG. 6: two connected components 482 and 484, are predictable, and the remaining four connected components 480, 486, 488 and 490 are unpredictable.

With respect to the process in box 150 (FIG. 5), temporal formatter 100 formulates the problem of assigning times to the events in each connected component as a linear program, which it solves using the simplex method, a well-known operations research technique for solving linear programs in a finite number of steps. The general problem of linear programming is to find values for a set of variables that maximize (or minimize) a linear function of those variables, called the objective function, subject to a set of linear constraints on the values of those variables.. Note that the term "linear constraints" or just "constraints" is used to refer to the linear equation input to the linear program, and not to the "temporal constraints" describing the temporal relationships specified by an author in a temporal specification. Although the worst-case execution time of the simplex method is exponential, most practical applications of this algorithm have polynomial execution times even for very large problems, consisting of hundreds of variables and thousands of constraints.

The linear program of temporal formatter 100 solves for three variables for each event $e_i$ in a connected component:

$time_i$ the time at which event $e_i$ should occur;

$amtEarly_i$, the length of time event $e_i$ occurs prior to its optimum time of occurrence; and $amtLate_i$, the length of time event $e_i$ occurs later than its optimum time of occurrence.

The time $time_i$ is relative to the start of the connected component containing that event. For events in predictable connected components, these times are relative to the start of the document; in unpredictable connected components, these times are relative to the time at which the triggering unpredictable event occurs. For any event $e_i$, its $amtEarly_i$ and $amtLate_i$ are nonnegative and at most one is positive. As noted earlier, in the illustrated embodiment, the flexibility metric data is duration-adjustment cost data 28 (FIG. 2) including cost $shrink_{i,\ i+1}$ data item 30 and cost $stretch_{i,\ i+1}$ data item 32. The objective function of the linear program minimizes the overall cost of stretching and shrinking the durations of media items. The linear constraints of the linear program are the durations between each pair of temporally adjacent events and the temporal constraints. Thus, the variables $amtEarly_i$ and $amtLate_i$ encode the stretching and/or shrinking needed to best capture the author's desired temporal constraints.

Temporal formatter 100 transforms a document's temporal specification into the objective function and the constraints used by the linear program, in boxes 154 and 158 of FIG. 5, as follows:

By definition, the start event of each media item $e_0$ occurs neither early nor late. A constraint is added to specify this:

$$amtEarly_0 = amtLate_0 = 0$$

The linear program represents the duration between temporally adjacent events $e_i$ and $e_{i+1}$ in a single media item as follows:

Case 1: An optimum duration has been specified. Three constraints are added:

1. an upper bound on the amount the duration is shrunk:

$$amtEarly_{i+1} \leq optDuration_{i,i+1}, \text{ if } minDuration_{i,i+1} = \text{unspecified}$$

$$amtEarly_{i+1} \leq optDuration_{i,i+1} - minDuration_{i,i+1}, \text{ otherwise}$$

2. an upper bound on the amount the duration is stretched:

$$amtLate_{i+1} < \infty, \text{ if } maxDuration_{i,i+1} = \text{unspecified}$$

$$amtLate_{i+1} \leq maxDuration_{i,i+1} - optDuration_{i,i+1}, \text{ otherwise}$$

3. the assigned values equal the optimum duration:

$$time_{i+1} - time_i + amtEarly_{i+1} - amtLate_{i+1} = optDuration_{i,i+1}$$

The shrinking and stretching costs are a linear function of the amount temporal formatter 100 shrinks the duration below its optimum value and stretches the duration beyond its optimum value, respectively. The objective function is updated to include these costs:

$$costShrink_{i,i+1} * amtEarly_{i+1} + costStretch_{i,i+1} * amtLate_{i+1}$$

Case 2: The optimum duration is unspecified. Three constraints are added to ensure that:

1. the duration never falls below the minimum duration:

$$time_{i+1} - time_i \geq 0, \text{ if } minDuration_{i,i+1} = \text{unspecified}$$

$$time_{i+1} - time_i \geq minDuration_{i,i+1}, \text{ otherwise}$$

2. the duration never exceeds the maximum duration:

$$time_{i+1} - time_i < \infty, \text{ if } maxDuration_{i,i+1} = \text{unspecified}$$

$$time_{i+1} - time_i \leq maxDuration_{i,i+1}, \text{ otherwise}$$

3. the event $e_{i+1}$ cannot occur early or late because no optimum duration is specified:

$$amtEarly_{i+1} = amtLate_{i+1} = 0$$

Because no optimum value is specified, no cost is associated with stretching or shrinking the duration of this interval.

Therefore, no terms are added to the objective function.

Case 3: The minimum, optimum, and maximum durations are unpredictable. Because the exact temporal relationships between events connected by an unpredictable duration are unknown, no constraints or costs are added for these temporal constraints.

The linear program represents a temporal constraint between two events as shown above in Table 2.

Finally, in box 170, temporal formatter 100 produces schedule command data structures for each connected component by visiting the events in temporal order, producing, in box 172, at most one command per event. Temporal formatter 100 merges commands for events in all predictable components into the main schedule data structure, in box 178; commands for unpredictable connected components are placed, in box 180, in separate auxiliary schedule data structures, which can be triggered by any unpredictable event in the connected component's trigger list. During this step, temporal formatter 100 must also adjust, in box 176, the media playback rates to ensure that the events occur at the times computed by the linear program in the preceding step. If the amtEarly and the amtLate for all events is zero, then temporal formatter 100 was able to position media segments without adjusting durations. Otherwise, temporal formatter 100 must add operations to adjust the media playback rates. Although these adjustments could be made straightforwardly by explicitly setting the playback rate at every event, that approach could require extra, unnecessary communication with the media items at runtime. In the illustrated embodiment it is assumed that no external triggers are required to continue the presentation of a media item at internal points, and that, after the "Start Display"

operation is issued to the media item, no further communication is required unless an internal event has operations associated with it. Temporal formatter 100 inserts a "Change Rate" operation event $e_{i+1}$ only if $amtEarly_{i+1}$ and $amtLate_{i+1}$ are not equal to $amtEarly_i$ and $amtLate_i$ for the preceding event $e_i$ in the same media item.

Table 4 below contains the schedules produced for the exemplary document shown in FIGS. 3 and 6. The main schedule, from the beginning of the table down to the first double line, shows the information in the schedule command data structures produced for the predictable connected components, 482 and 484. The remaining four connected components 480, 486, 488 and 490 are unpredictable, so temporal formatter 100 places their information in four separate auxiliary schedule data structures, which information is shown separated by double lines in Table 4. Each of these auxiliary schedules is triggered by a single unpredictable event.

TABLE 4

The partial temporal layout for the Physics Lecture

| Time (min:se | Conn Comp | Media Item | Event | Unpredictable Events Activate | Deactivate | Operations |
|---|---|---|---|---|---|---|
| 0:0 | 1 | E & M Lecture | Start | — | — | Start Display |
|  | 3 | Calendar Tool | Start | Related Lecture | — | Start Display |
| 0:10 | 1 | Dictionary | Start | Define Electrolyte | — | Start Display |
| 20:0 | 1 | E & M Lecture | Battery Operation | — | — | — |
|  |  | Battery Animation | Start | — | — | Start Display Change Rate 0.75 |
| 29:0 | 1 | E & M Lecture | End | — | — | End Display |
|  |  | Battery Animation | End | — | — | End Display |
| 29:30 | 1 | Dictionary | End | — | Define Electrolyte | End Display |
| 0:0 | 2 | Dictionary | Define Electrolyte | — | — | — |
|  |  | Electrolyte Definition | Start | — | — | Start Display |
| 10:0 | 2 | Electrolyte Definition | End | — | — | End Display |
| 0:0 | 4 | Calendar Tool | End | — | Related Lecture | End Display |
| 0:0 | 5 | Calendar Tool | Related Lecture | — | — | Pause All Other Send Message |
|  |  | Audio Controller | Start | Leave Talk | — | Start Display |
| 0:0 | 6 | Audio Controller | Leave Talk | — | — | Resume All |
|  |  | Audio Controller | End | — | Leave Talk | End Display |

A current embodiment of the present invention has been implemented on a Sun Microsystems Sparcstation computer in a research software application program written in the Cedar programming environment, a Xerox proprietary research software environment, utilizing the Cedar programming language. More information about the Cedar programming environment and the Cedar programming language may be found in [Swinehart 1986].

Appendix A (©1992, Xerox Corporation) included herein below provides a source code listing implementing some of the features of temporal formatter 100 as described above. The code in Appendix A, when executed on a Sun Microsystems Sparcstation computer, generally follows the implementation described in relation to FIGS. 5 and 7 above. Nonetheless, the code may differ from the above description in various ways. For example, the code may be divided into procedures or routines differently than described above. In the code in Appendix A, the actual procedure for the linear programming simplex method is referred to by the procedure name "Simplex." This procedure is a standard software procedure for performing the linear programming, and is not included in the code in Appendix A.

b. An alternative implementation.

In an alternative implementation, the events in a time-dependent document may also be flexibly positioned in time using a shortest path algorithm. The shortest path algorithm is a polynomial algorithm ($O(n^3)$) that supports a limited form of stretching and shrinking using minimum and maximum durations only. Instead of computing "optimal" event times, this algorithm produces a range of legal times at which each event can occur. In another embodiment of the method of the present invention, temporal formatter 100 used this algorithm, scheduling each event at the earliest possible time in its legal range. This implementation did not make use of a flexibility metric. However, this algorithm very quickly determines whether at least one consistent temporal layout can be produced, and so it is useful for either debugging or as a preprocess to more quickly identify the existence of a consistent temporal layout for the particular input temporal specificaton.

5. The runtime component of the temporal formatter.

Figure 8:
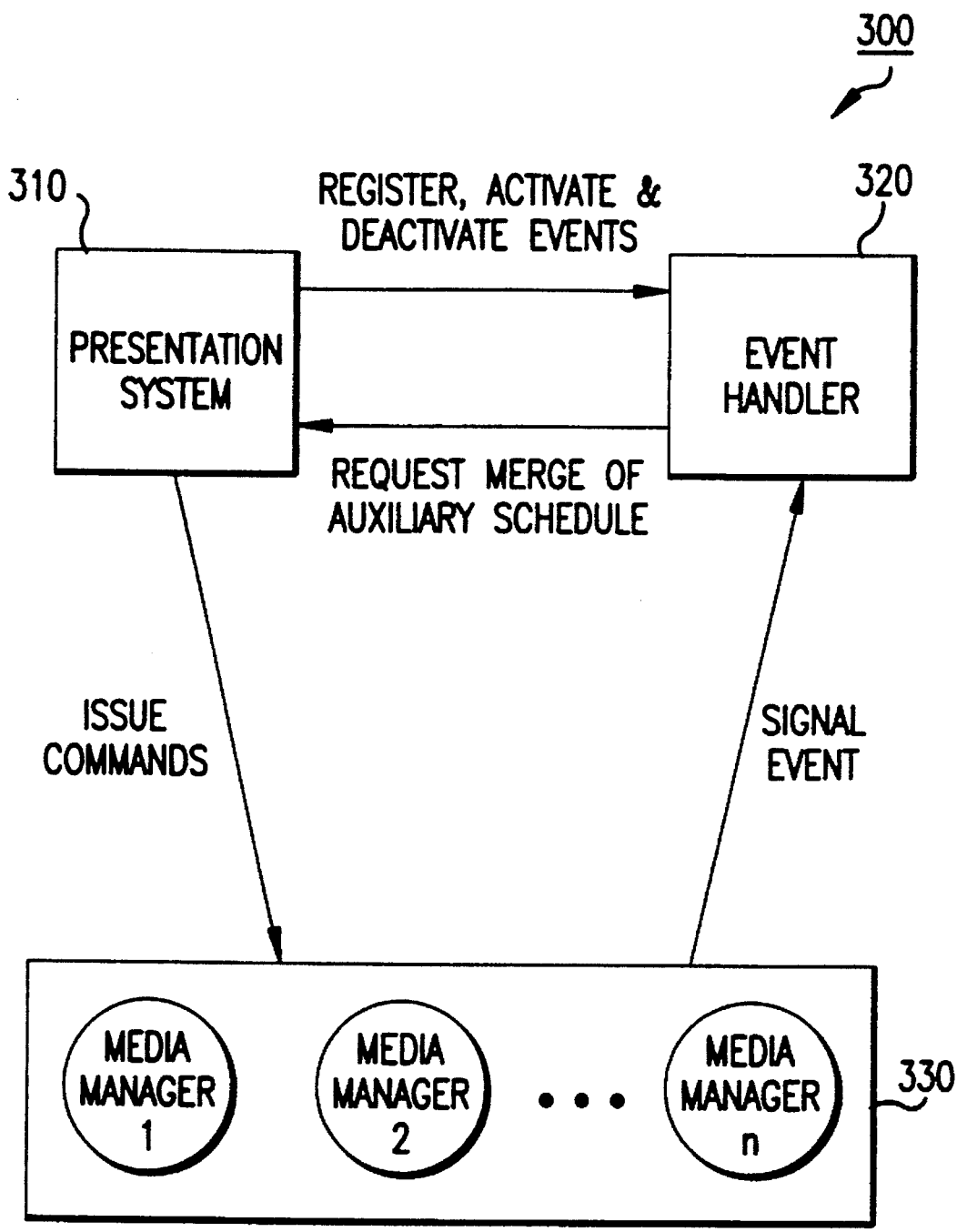
FIG. 8 is a block diagram schematically illustrating the runtime component of the temporal formatter of the present invention.

The temporal layout, in the form of the schedule data structure, produced by temporal formatter 100 is passed to a runtime component, called the runtime formatter 300 (FIG. 1), that operates while the time-dependent document is being presented. Runtime formatter 300 controls the presentation of the document by managing a document clock that controls when commands are issued, and by monitoring unpredictable events that control when main and auxiliary schedules are merged together. The functional parts of runtime formatter 300 and the interactions among them are illustrated in FIG. 8. Runtime formatter 300 initiates the presentation of a document when it receives a schedule data structure from temporal formatter 100, and is comprised of three subsystems. Presentation system 310 manages the document clock, executes the information presented in the schedule command data structures for each event, and merges the main and auxiliary schedule data structures into an executing schedule data structure. Event handler 320 monitors unpredictable events. Media managers 330 execute the operations indicating event presentation actions in the main and auxiliary data structures and detect the occurrence of unpredictable events.

When the presentation of a document is initiated, presentation system 310 registers the document's unpredictable events and auxiliary schedule data structures, places the commands from the main schedule data structure into the executing schedule data structure, and starts the document clock. To register unpredictable events and the information indicated in their associated auxiliary schedule data structures, presentation system 310 establishes a list of the unpredictable events the document recognizes, and associates each of the unpredictable events with the information indicated in the respective auxiliary schedule data structure for that event. This list is then registered with event handler 320. Unpredictable events are marked as either active or inactive as described below. Initially, all unpredictable events are inactive. An unpredictable event becomes active at the beginning of the presentation of the media item that includes the unpredictable event.

The document clock is initialized to zero and is incremented until the presentation of the document is completed, or until the reader explicitly pauses or terminates the presentation of the entire document. The document time of a paused document remains fixed until the reader resumes its presentation. The document clock rate can be adjusted to speed up or slow down document playback.

Presentation system 310 removes each command from the executing schedule data structure when the document clock reaches the specified time. Commands are executed in two steps. First, presentation system 310 activates or deactivates any specified unpredictable events. Then, presentation system 310 issues the specified operations to control the behavior of a media item or to support inter-media item communication.

Event handler 320 monitors unpredictable events by detecting their occurrence and by determining whether they should affect the document's behavior. When one of the media managers 330 detects the occurrence of an unpredictable event, it signals the event occurrence to event handler 320. Event handler 320 maintains the list of active and inactive unpredictable events, and determines whether the unpredictable event is active or inactive. Inactive unpredictable events are ignored by event handler 320. For active unpredictable events, event handler 320 passes the active unpredictable event signal to presentation system 310, requesting that presentation system 310 retrieve the information from the associated auxiliary schedule data structure that is needed to present the portion of the document controlled by the active predictable event. Presentation system 310 identifies the associated auxiliary schedule data structure, produces a new instance of it, converts the relative time data included in the auxiliary schedule data structure into absolute time data by adding the current document time, and merges the information in the auxiliary schedule data structure into the executing schedule data structure. Because multiple instances of an auxiliary schedule can appear in the executing schedule at any time, runtime formatter 300 must be able to distinguish among them when executing commands. Therefore, presentation system 310 also adds information to each command to identify the instance to which it belongs.

Media items may send messages to each other during their execution and presentation. A document author may specify that the decision to determine what message to send may be delayed until runtime. During the compiletime phase of the present invention, an event presentation action of "send message" is produced in the temporal layout, indicating that the message content is to be determined at runtime. During the runtime phase, when presentation system 310 encounters an event presentation action of "send message," it signals the message generating control procedure of the applicable media manager 330 to determine what message should be sent. Messages may be sent to one or more specific media items, or broadcast to all active media items.

C. The system environment and system configuration of the present invention.

The method of operating a processor-based system of the present invention has the common components, characteristics, and configuration of system 500 illustrated in FIG. 9. System 500 includes input circuitry 552 for receiving input "request" signals from user interaction device 554 indicating image display requests. An image display request may include a request for an operation and information identifying the requested operation, wherein the signal or signals indicate one or more actions by a system user intended to cause performance of the operation. User interaction device 554 may include any one of a variety of input devices controllable by a human user, including a keyboard, or a pointing and gesturing device to indicate actions or gestures, such as a mouse, trackball, or a stylus or pen-like device. Processor 540 is connected for receiving the signals from input circuitry 552.

System 500 also includes memory 510 for storing data. Processor 540 is connected for accessing the data stored in memory 510, and for providing data for storing in memory 510. Memory 510 stores instruction data indicating instructions the processor executes, including the instruction data indicating the instructions for operating system 500 according to temporal formatter 100 of the present invention. Memory 510 also stores the document specification data structure 60, the media specification data structure 10, and the schedule data structure 200. Memory 510 may also store some of the media items 90. The physical embodiment of memory 510 is a "data storage medium" or "storage medium". A "data storage medium" or "storage medium" is a physical medium that can store data. Examples of data storage media include magnetic media such as floppy disks and PCMCIA memory cards, optical media such as CD-ROMs, and semiconductor media such as semiconductor ROMs and RAMs. As used herein, "storage medium" covers one or more distinct units of a medium that together store a body of data. For example, a set of floppy disks storing a single body of data would be a storage medium. A "storage medium access device" is a device with circuitry that can access data on a data storage medium. Examples include floppy disk drives and CD-ROM readers.

Processor 540 is also connected for providing data defining an image, for example, the images shown in display area 580 in FIGS. 3 and 6, to output circuitry 560 for presentation on display device 570 in display area 580. With respect to circuitry components, any two components of circuitry are "connected" when there is a combination of circuitry that can transfer data from one of the components to the other. Processor 540 is further connected for providing data defining images, produced according to the method of the present invention, to output circuitry 560 for presentation on display 570 in display area 580. Output circuitry 560, input circuitry 552, display 570, processor 540 and memory 510 may be physically embodied in one device.

System 500 may also includes one or more additional media presentation devices 590, in addition to display device 570, each having its own appropriate output circuitry (not shown.) Processor 540 is also connected for providing data from the executing schedule data structure to the media presentation devices during the presentation of a time-dependent document. In addition, media presentation device 590 may include some portion of memory 510 for storing a media item, and processor 540 is also connected for accessing the memory 510 included in media presentation device 590 during the processing of temporal formatter 100 or its runtime formatter 300. For example, media presentation device 590 may be a device such as a computer with its own processor and memory, and storing a data base such as the dictionary needed to display the electrolyte definition in the exemplary physics lecture document described above.

The actual manner in which the physical hardware components of system 500 are connected may vary, and may include hardwired physical connections between some or all of the components, connections over wired or wireless communications facilities, such as through remote or local communications networks and infrared and radio connections. For example, memory 510 may include memory that is physically connected to processor 540 as local memory, or that is remotely accessible to processor 540 by means of a wired or wireless communications facility, such as memory included in a media presentation device. Thus, when it is described that the method causes processor 540 to access or obtain a particular data item, that data item may be stored in a memory device that is remotely located from system 500 but which is accessible to processor 540 by means of the appropriate connections. It is further of importance to note that the range of the physical size of system 500 may include a small desktop, laptop, or pocket-sized or smaller device to larger more conventionally sized systems such as those including personal computers or workstations, or even to large electronic whiteboard applications. It is intended that the method of operating a system according to the present invention be operable on all systems in this physical size range.

The system configuration of the present invention includes the components shown in FIG. 9. Processor 540 is operated according to the method of the present invention shown in FIGS. 5 and 7, and creates, stores and manipulates the data structures shown in FIGS. 2 and 4 in memory 510.

The system of the present invention uses an open architecture that allows existing media managers to be incorporated into the system. These media managers control the storage, presentation, and editing of media items of a specific media type. The system's open architecture allows new media types to be added as they become available. In the system of the illustrated embodiment, four media managers are supported: a text editor, a 2D color graphical editor, a digital audio editor, and a clock animation.

As noted earlier, a current embodiment of the present invention has been implemented on a Sun Microsystems Sparcstation computer in the Cedar programming environment utilizing the Cedar programming language. It will be apparent to those of skill in the art that a wide variety of programming languages and hardware configurations could readily be used in place of those used in the illustrated embodiment based on the description herein and on the system illustration in FIG. 9 without departing from the scope and intended utility of the method of the present invention.

D. References.

[Blakowski 1992]: Blakowski G., Hubel J., and Langrehr U., "Tools for specifying and executing synchronized multimedia presentations," in R. G. Herrtwich, ed., *Network and Operating System Support for Digital Audio and Video*, Lecture Notes in Computer Science No. 614, Springer-Verlag, 1992.

[Buchanan Nov. 1992]: Buchanan M. C. and Zellweger P., "Scheduling multimedia documents using temporal constraints," in: *Proceeding of the 3rd Int'l Workshop on Network and OS support for Digital Audio and Video*, San Diego, Calif., Nov. 12–13, 1992, pp. 223–235.

[Buchanan Dec. 1992]: Buchanan M. C. and Zellweger P., "Specifying temporal behavior in hypermedia documents," in: Lucarella D., Nanard J., Nanard M., Paolini P. (eds.), *Proceeding of the ACM Conference on Hypertext*, ACM Press, New York, Dec. 1992, pp. 262–271.

[Buchanan 1993]: Buchanan M. C. and Zellweger P., "Automatic Temporal Layout Mechanisms," in: *Proceedings of the First ACM Int'l Conference on Multimedia* 1993, Anaheim, Calif., Aug. 1993.

[Bulterman 1991]: Bulterman D., van Rossum G., and van Liere R., "A structure for transportable, dynamic multimedia documents" in *Proceedings* 1991 *Summer USENIX Conference, Nashville, Tenn., June* 1991, pp. 137–155.

[Drapeau 91]: Drapeau G., and Greenfield H. "MAEstro—A distributed multimedia authoring environment," in *Proceedings* 1991 Summer USENIX Conference, Nashville, Tenn., June 1991, pp. 315–328.

[Fiume 87]: Fiume E., Tsichritzis D, and Dami L. "A temporal scripting language for object-oriented animation," in *Proceedings Eurographics'87*, Elsevier Science Publishers, North-Holland Publishing Company, Amsterdam, 1987.

[Little 1990]: Little T. and Ghafoor A., "Synchronization and storage models for multimedia objects," *IEEE J. Selected Areas of Communication*, 8, 3 (April 1990), pp. 413–427.

[MacroMind 89]: MacroMind Director: Overview manual, MacroMind, Inc., March 1989.

[Ogawa 90]: Ogawa R., Harada H. and Kameko A., "Scenario-based hypermedia: A model and a system," in: Rizk A., Streitz N., Andre J. (eds.), *Hypertext: Concepts, systems, and applications*, Cambridge Univ. Press, 1990, pp. 38–51.

[QuickTime 91]: Poole L. "QuickTime in motion," *MACWORLD* (Sept. 1991), pp. 154–159.

[Stotts 1990]: Stotts D. and Furuta R., "Temporal hyperprogramming," *J. Visual Languages and Computing* 1,3 (Sept. 1990), pp. 237–253.

[Swinehart 1986]: Swinehart D., Zellweger P., Beach R., and Hagmann R., "A structural view of the Cedar programming environment," *ACM Trans. Prog. Languages and Syst.* 8, 4 (Oct. 1986), pp. 419–490.

E. Additional considerations and conclusions.

Actual experience with temporal formatter 100 shows reasonable performance metrics. Performance studies of the illustrated embodiment of the method indicate that large connected components can substantially increase the execution time of the linear programming implementation, while small connected components have much less effect on overall execution time. Sparse matrix techniques may be used to improve the performance of the current simplex method implementation.

With respect to media items, such as text and still images, that do not ordinarily include any notion of time in their specifications, it has been noted above that an author can choose to impose either predictable or unpredictable durations on such media items. In the predictable case, such durations should be specified as having predictable durations with a minimum duration of zero, an optimum duration that estimates the length of time an average reader needs to view the material, and an unspecified maximum duration. Very low stretching and shrinking costs are associated with these durations so that the temporal formatter will attempt to adjust them first. If such media items are specified as having a minimum duration of zero, an unspecified optimum duration, and an unspecified maximum duration, no stretching and shrinking costs would be required, and because no cost would be associated with stretching or shrinking these durations, temporal formatter 100, in attempting to adjust these durations first might set the durations to zero and thus the media items would effectively disappear.

The temporal formatting method and system of the present invention provided herein may be modified to take into account predictable media setup times, such as those required to spin up video playback heads. Temporal formatter 100 could be integrated into existing manual temporal formatting systems that already have a model for handling such setup times, and would be able to process such setup times during the temporal formatting of the document without modification. In the illustrated embodiment, such setup times could be accommodated, again without modification of temporal formatter 100, if the media-level specification were extended to include a new event called a setup event. The setup event would occur before the start event and the duration between the setup and start events would be set equal to the expected media setup time. The author would specify the setup event and its duration, or this information could be automatically provided from the presentation device's media manager, if available.

The temporal formatting method and system of the present invention provided herein may also be modified to take into account presentation device resource checking. Temporal formatter 100 currently has access to data specifying the document's presentation device requirements. An additional data structure, or a modification to an existing data structure, specifying the available presentation devices available to the author or reader in the system currently being used could be provided. With access to such a data structure, temporal formatter 100 could be modified to add a step to determine whether event presentation actions specified in each schedule command data structure can be met with available devices. This resource checking would also include checking, for concurrently presented media items of the same type, that sufficient resources were available. For example, temporal formatter 100 could be modified to check that, if two predictable video segments were temporally formatted to be presented concurrently by temporal formatter 100, checking could be done to ensure that the presentation system included two video playback devices. For documents including media items having unpredictable behavior, the runtime component of the temporal formatting method of the present invention would need to be modified to check such resource requirements each time it merges an auxiliary data structure into an executing scheduling data structure.

In summary, the method and system of the present invention for automatically temporally formatting the media segments of a time-dependent document provides for flexibly assigning times to media segments between a continuously adjustable range of durations; handling a variety of types of temporal behavior; detecting temporal mismatches among the specified temporal relationships of the media; and, because it executes in both compiletime and runtime in the document production cycle, handling the temporal formatting of unpredictable events. The method of the present invention produces consistent temporal layouts for documents with both predictable and unpredictable behavior. The two-phase approach used by the method has several advantages. Predictable temporal inconsistencies can be identified and resolved in advance of the presentation of the document by adjusting the media items to produce durations of desired or necessary lengths. In addition, the method handles both predictable and unpredictable behavior in a uniform manner.

APPENDIX A

-- AnalysisImpl.mesa
-- Copyright © 1992 by Xerox Corporation. All rights reserved.
--
DIRECTORY
Analysis,
Basics,
CardTab,
Convert,
CodeTimer,
DocumentObj,
List,
MediaClass,
PrimitiveObj,
Real,
RefTab,
Rope,
ScheduleGenAndViewtimePrivate,
ScheduleGenerationPrivate,
Simplex,
SymTab,
Tiger,
UserCommunication
;

AnalysisImpl: CEDAR PROGRAM
 IMPORTS CardTab, CodeTimer, Convert, DocumentObj, List, PrimitiveObj, Real, RefTab,
Rope, ScheduleGenAndViewtimePrivate, Simplex, SymTab, UserCommunication
 EXPORTS Analysis
 ~ BEGIN OPEN Analysis;

REALINFINITY: REAL = Real.LargestNumber;

MediaItemID: TYPE ~ Tiger.MediaItemID;
EventID: TYPE ~ Tiger.EventID;
InstanceID: TYPE ~ Tiger.InstanceID;
SyncConstraintTime: TYPE ~ Tiger.SyncConstraintTime;
SyncConstraintTimeInfo: TYPE ~ Tiger.SyncConstraintTimeInfo;
EventOfPrimitiveEntity: TYPE ~ Tiger.EventOfPrimitiveEntity;

EventInConnComp: TYPE ~ ScheduleGenerationPrivate.EventInConnComp;
RowN: TYPE ~ ScheduleGenerationPrivate.RowN;

```
MatrixN: TYPE ~ ScheduleGenerationPrivate.MatrixN;
VecSeq: TYPE ~ ScheduleGenerationPrivate.VecSeq;
CommandTime: TYPE ~ ScheduleGenerationPrivate.CommandTime;
CommandTimeInfo: TYPE ~ ScheduleGenerationPrivate.CommandTimeInfo;
ObjectiveFunElement: TYPE ~ ScheduleGenerationPrivate.ObjectiveFunElement;

ClusteredCommand: TYPE ~ ScheduleGenerationPrivate.ClusteredCommand;
ClusteredCommandInfo: TYPE ~ ScheduleGenerationPrivate.ClusteredCommandInfo;
ObjectiveFunVec: TYPE ~ ScheduleGenerationPrivate.ObjectiveFunVec;
CardVector: TYPE ~ ScheduleGenerationPrivate.CardVector;
AdjustVar: TYPE ~ ScheduleGenerationPrivate.AdjustVar;

DisplayCommand: TYPE ~ ScheduleGenAndViewtimePrivate.DisplayCommand;
DisplayCommandInfo: TYPE ~ ScheduleGenAndViewtimePrivate.DisplayCommandInfo;
DisplayCommandList: TYPE ~ ScheduleGenAndViewtimePrivate.DisplayCommandList;
Operation: TYPE ~ ScheduleGenAndViewtimePrivate.Operation;
OperationInfo: TYPE ~ ScheduleGenAndViewtimePrivate.OperationInfo;
MediaItemControlPanelProcs: TYPE ~
ScheduleGenAndViewtimePrivate.MediaItemControlPanelProcs;

-- Scheduling Code
--
 CreateSchedule: PUBLIC PROC [lpInput: LPInput ← NIL] RETURNS [status: ATOM ← $Success,
displayCommandList: DisplayCommandList ← NIL,
asyncEventDisplayCommandsByEventInstanceID: RefTab.Ref ← NIL,
mediaItemInstanceIDsInSchedule: List.LORA ← NIL, mediaItemControlPanelProcs: RefTab.Ref
← NIL] ~ {

ExamineEachEvent: RefTab.EachPairAction ~ {
    -- eventInstanceIDToArrayColNum: key: eventInstanceID, val: arrayColNum (REF CARD).
    --
    eventArrayColNum: CARD ← NARROW[val, REF CARD]↑;
    found: BOOLEAN ← FALSE;
    eventInfoVal: CardTab.Val ← NIL;
    eventInfo: EventInConnComp ← NIL;
    newCommand: DisplayCommand ← NIL;
    newMediaItemControlPanelProcs: MediaItemControlPanelProcs ← NIL;

[found, eventInfoVal] ← CardTab.Fetch[lpInput.arrayColNumLookupTable,
eventArrayColNum];
    IF NOT found THEN ERROR;

eventInfo ← NARROW[eventInfoVal];
    IF eventInfo = NIL THEN ERROR;
```

```
    [newCommand, newMediaItemControlPanelProcs] ←
ConstructCommand[lpInput.lpInputID, eventInfo];

SELECT eventInfo.class FROM
        $Start, $End, $Synchronous = >
        IF newCommand # NIL THEN BEGIN
            displayCommandList ← List.Append[displayCommandList, LIST[newCommand] ];
            IF eventInfo.class = $Start THEN
                mediaItemInstanceIDsInSchedule ← List.Append[mediaItemInstanceIDsInSchedule,
LIST[eventInfo.mediaItemInstanceID] ];
            END;
        ENDCASE = > BEGIN
            IF asyncEventDisplayCommandsByEventInstanceID = NIL THEN
asyncEventDisplayCommandsByEventInstanceID ← RefTab.Create[];
            IF NOT RefTab.Store[asyncEventDisplayCommandsByEventInstanceID,
eventInfo.eventInstanceID, IF newCommand = NIL THEN NIL ELSE LIST[newCommand] ]
THEN ERROR;
            END;

IF newMediaItemControlPanelProcs # NIL THEN BEGIN
            IF mediaItemControlPanelProcs = NIL THEN mediaItemControlPanelProcs ←
RefTab.Create[];
            IF NOT RefTab.Store[mediaItemControlPanelProcs, eventInfo.mediaItemInstanceID,
newMediaItemControlPanelProcs] THEN ERROR;
            END;
        };

objectiveFunction: ObjectiveFunVec ← NIL;
    lpOutputArray: MatrixN ← NIL;
    basis: CardVector ← NIL;
    rowArrayNumRepByMVar: CardVector ← NIL;
    savedObjectiveFunction: ObjectiveFunVec ← NIL;
    pivotSequence: List.LORA ← NIL;
    sortedCommandList: List.LORA ← NIL;
    clusteredCommandList: List.LORA ← NIL;
    objectiveRope: Rope.ROPE ← NIL;
    objFunValue: ObjectiveFunElement;

[objectiveFunction, lpOutputArray, basis, rowArrayNumRepByMVar,
savedObjectiveFunction] ← Simplex.BuildLPArray[lpInput.lpObjectiveFun,
lpInput.lpInputArray, lpInput.leConstraintCount, lpInput.geConstraintCount,
lpInput.eConstraintCount];

[status, pivotSequence] ← Simplex.SolveLP[objectiveFunction, lpOutputArray, basis];
```

```
-- Check the value of the objective function to see if we have found a feasible solution.
IF status = $NoColumnEnterFound THEN BEGIN
  FOR i: CARD IN [0..basis.length) DO
    SELECT basis[i] FROM
      > lpInput.lpObjectiveFun.ncols + lpInput.leConstraintCount +
lpInput.geConstraintCount + 2*lpInput.eConstraintCount = >
        objFunValue.m ← objFunValue.m + lpOutputArray[i] [0];
      > 0 = >
        objFunValue.constant ← objFunValue.constant + (lpOutputArray[i] [0] *
savedObjectiveFunction[basis[i] ].constant);
      ENDCASE = > ERROR;
    ENDLOOP;

IF objFunValue.m # 0.0 THEN BEGIN
    status ← $MVarsLeftInObjective;
    objectiveRope ← Rope.Concat[Convert.RopeFromReal[objFunValue.m], "M"];
    END;

IF objectiveRope # NIL THEN objectiveRope ← Rope.Concat[objectiveRope, " + "];
    objectiveRope ← Rope.Concat[objectiveRope,
Convert.RopeFromReal[objFunValue.constant] ];

UserCommunication.PrintMessage[lpInput.documentID.otterRouter,
Rope.Concat["Objective: ", objectiveRope] ];
  END;

-- If the presentation is consistent, then create a list of display commands that will be used
by the Viewtime system for controlling the display of the presentation. Otherwise, we should
provide tools that help identify what is wrong with the document specification.
  SELECT status FROM
    $NoExitRowFound, $MVarsLeftInObjective = > BEGIN
      UserCommunication.PrintErrorMessage[lpInput.documentID.otterRouter, "No solution
found."];
      RETURN[status, NIL, NIL, NIL, NIL];
      END;

$NoColumnEnterFound = > BEGIN
      ReadScheduleTimes[objectiveFunction, lpOutputArray, basis, lpInput];

[] ← RefTab.Pairs[lpInput.eventInstanceIDToArrayColNum, ExamineEachEvent];

sortedCommandList ← List.Sort[displayCommandList, CompareDisplayCommands];
      displayCommandList ← sortedCommandList;
```

```
   -- Detect commands for a single primitive entity that are clustered at the same time (at a
granularity of milliseconds).
   --
   clusteredCommandList ← FindClusteredDisplayCommands[displayCommandList];
   IF clusteredCommandList # NIL THEN
UserCommunication.PrintClusteredCommandInfo[lpInput.documentID,
clusteredCommandList];
      status ← $Success;
      END;
   ENDCASE = > ERROR;
 };

ConstructCommand: PROC [lpInputID: Rope.ROPE ← NIL, eventInfo: EventInConnComp ←
NIL] RETURNS [displayCommand: DisplayCommand ← NIL, mediaItemControlPanelProcs:
MediaItemControlPanelProcs ← NIL] ~ {
   eventID: EventID;
   operations: List.LORA;
   activateAsyncEventInstanceIDs: List.LORA ← NIL;
   deactivateAsyncEventInstanceIDs: List.LORA ← NIL;
   mediaClassMethods: MediaClass.MediaClassMethods ← NIL;
   supportedOperations: List.LORA ← NIL;
   unsupportedOperations: List.LORA ← NIL;
   displayOperations: List.LORA ← NIL;
   endDisplayMediaItem: BOOLEAN ← FALSE;
   found: BOOLEAN ← FALSE;
   timeVal: SymTab.Val ← NIL;
   commandTime: CommandTime ← NIL;
   commandTimeSec: INT ← 0;
   commandTimeUSec: INT ← 0;
   optimalDuration: SyncConstraintTime ← NIL;

[found, timeVal] ← SymTab.Fetch[eventInfo.commandTimes, lpInputID];
   IF NOT found THEN ERROR;

commandTime ← NARROW[timeVal];

-- If the command is to occur at INFINITY, then don't issue the command because it will
never occur.
   IF commandTime.scheduledAtTime = REALINFINITY THEN RETURN;

commandTimeSec ← Real.Fix[commandTime.scheduledAtTime];
   commandTimeUSec ← Real.Fix[(commandTime.scheduledAtTime - commandTimeSec) *
1000000];

mediaClassMethods ← PrimitiveObj.GetClassOfPrimitiveEntity[eventInfo.mediaItemID];
```

```
IF mediaClassMethods = NIL THEN ERROR;

-- See if the current event is a start or end event. If so, then we have to add the commands
$start or $end, respectively.
  SELECT eventInfo.class FROM
    $Start = > BEGIN
      mediaItemControlPanelProcs ← mediaClassMethods;
      --
      -- mediaItemControlPanelProcs _
        -- NEW[MediaItemControlPanelProcsInfo _ [
          -- pauseProc: mediaClassMethods.pause,
          -- resumeProc: mediaClassMethods.resume,
          -- endProc: mediaClassMethods.end,
          -- endAndCleanUpProc: mediaClassMethods.endAndCleanUp
        -- ] ];

activateAsyncEventInstanceIDs ←
DocumentObj.GetAsyncEventInstanceIDsForMediaItemInstance[eventInfo.documentID,
eventInfo.mediaItemInstanceID];

-- We are looking at an asynchronous media item, so we have to activate that event.
        IF eventInfo.durationToNextEvent = NIL THEN BEGIN
          asyncEndEventInfo: EventOfPrimitiveEntity ←
PrimitiveObj.GetEndEventInfo[eventInfo.mediaItemID];
          asyncEndEventInstanceID: InstanceID ←
DocumentObj.GetEventInstanceID[eventInfo.documentID, eventInfo.mediaItemInstanceID,
asyncEndEventInfo.eventID];

IF asyncEndEventInstanceID = NIL THEN ERROR;

activateAsyncEventInstanceIDs ← CONS[asyncEndEventInstanceID,
activateAsyncEventInstanceIDs];
        END;
        IF eventInfo.operations = NIL OR NARROW[List.NthElement[eventInfo.operations, 1],
Operation].operator # $start THEN
          eventInfo.operations ← List.Append[LIST[NEW[OperationInfo ← [operator: $start] ] ],
eventInfo.operations];
        END;
      $End, $EndAsync = > BEGIN
        deactivateAsyncEventInstanceIDs ←
DocumentObj.GetAsyncEventInstanceIDsForMediaItemInstance[eventInfo.documentID,
eventInfo.mediaItemInstanceID];
        -- If we are looking at an asynchronous end event, we have to deactivate it when the
command gets executed.
        IF eventInfo.class = $EndAsync THEN
```

```
    deactivateAsyncEventInstancelDs ← CONS[eventInfo.eventInstanceID,
deactivateAsyncEventInstancelDs];
    endDisplayMediaItem ← TRUE;
    IF eventInfo.operations = NIL OR NARROW[List.NthElement[eventInfo.operations,
List.Length[eventInfo.operations] ], Operation].operator # $end THEN
        eventInfo.operations ← List.Append[eventInfo.operations, LIST[NEW[OperationInfo ←
[operator: $end] ] ] ];
    END;
    ENDCASE = > NULL;

[supportedOperations, unsupportedOperations] ←
mediaClassMethods.checkIfOperationsSupported[eventInfo.operations];
    FOR ol: List.LORA ← supportedOperations, ol.rest WHILE ol # NIL DO
        currOperation: Operation ← NARROW[ol.first];

currOperation.operatorProc ← SELECT currOperation.operator FROM
        $start = > mediaClassMethods.start,
        $showSelection = > mediaClassMethods.showSelection,
        $zoom = > mediaClassMethods.zoom,
        $openViewer = > mediaClassMethods.openViewer,
        $closeViewer = > mediaClassMethods.closeViewer,
        $destroyViewer = > mediaClassMethods.destroyViewer,
        $pause = > mediaClassMethods.pause,
        $resume = > mediaClassMethods.resume,
        $end = > mediaClassMethods.end,
        $query = > mediaClassMethods.query,
        $sendMessage = > mediaClassMethods.sendMessage,
        ENDCASE = > ERROR;

IF currOperation.operatorProc = NIL THEN ERROR;

displayOperations ← List.Append[displayOperations, LIST[currOperation] ];
    ENDLOOP;

-- Include a rate change (actually a rate setting) operation. Right now we have to put one
per node. Maybe we can be more intelligent able this and only include this operation when
it is really needed:
    -- 1) We really need to change the rate (i.e., commandTime.amountEarly # 0.0 OR
commandTime.amountLate # 0.0), OR
    -- 2) We need to restore the rate back to the optimal rate.
    IF mediaClassMethods.changeRate = NIL THEN
        IF commandTime.amountEarly # 0.0 OR commandTime.amountLate # 0.0 THEN ERROR
        ELSE optimalDuration ← NIL
    ELSE
        IF eventInfo.durationToNextEvent # NIL THEN BEGIN
```

```
changeRateOper: Operation ← NEW[OperationInfo ← [
  operator: $changeRate,
  operand: NIL,
  operatorProc: mediaClassMethods.changeRate
  ]];
IF eventInfo.durationToNextEvent.opt = NIL THEN ERROR;

optimalDuration ← eventInfo.durationToNextEvent.opt;
displayOperations ← List.Append[LIST[changeRateOper], displayOperations];
END;
```

-- If the command has no operations and we don't have to activate or deactive any asynchronous events, then don't bother to add a command because we don't need one.
```
IF displayOperations = NIL AND activateAsyncEventInstanceIDs = NIL AND
deactivateAsyncEventInstanceIDs = NIL AND NOT endDisplayMediaItem THEN RETURN[NIL,
NIL];
```

-- basetime and scheduleInstanceID are filled in at viewtime when this schedule becomes active.
```
displayCommand ← NEW[DisplayCommandInfo ← [
  commandTime: [
    sec: commandTimeSec,
    usec: commandTimeUSec
    ],
  baseTime: NIL,
  nextNodeAmountEarly: commandTime.amountEarly,
  nextNodeAmountLate: commandTime.amountLate,
  optimalDuration: optimalDuration,
  documentID: eventInfo.documentID,
  mediaItemID: eventInfo.mediaItemID,
  mediaItemInstanceID: eventInfo.mediaItemInstanceID,
  scheduleInstanceID: NIL,
  eventID: eventInfo.eventID,
  eventInstanceID: eventInfo.eventInstanceID,
  operations: displayOperations,
  activateAsyncEventInstanceIDs: activateAsyncEventInstanceIDs,
  deactivateAsyncEventInstanceIDs: deactivateAsyncEventInstanceIDs,
  instantiateMediaItem: IF eventInfo.class = $Start THEN
mediaClassMethods.createMediaItemInstance ELSE NIL,
  endDisplayMediaItem: endDisplayMediaItem
  ]];
};
ReadScheduleTimes: PROC [objective: ObjectiveFunVec ← NIL, lpArray: MatrixN ← NIL,
basis: CardVector ← NIL, lpInput: LPInput ← NIL] ~ {
  simplexValues: RowN ← NEW[VecSeq[lpArray[0].ncols] ];
```

-- Put the values computed using the Simplex method into a vector so that we can pull out the values in a uniform manner.
```
FOR i: CARD IN [0..lpArray.nrows) DO
  simplexValues[basis[i] ] ← lpArray[i] [0];
ENDLOOP;

FOR i: CARD IN [0..simplexValues.ncols) DO
  found: BOOLEAN ← FALSE;
  val: CardTab.Val ← NIL;
```

-- If value in basis[i] is in lpInput.arrayColNumLookupTable, then we are looking at one of our variables. Otherwise, we are looking at a slack or artificial variable and we can ignore it.
```
  [found, val] ← CardTab.Fetch[lpInput.arrayColNumLookupTable, i];
  IF found THEN
    WITH val SELECT FROM
      nodeTime: EventInConnComp = > BEGIN
        timeVal: SymTab.Val ← NIL;
        commandTime: CommandTime ← NIL;

[found, timeVal] ← SymTab.Fetch[nodeTime.commandTimes, lpInput.lpInputID];
        IF found THEN commandTime ← NARROW[val]
        ELSE BEGIN
          commandTime ← NEW[CommandTimeInfo];
          IF NOT SymTab.Store[nodeTime.commandTimes, lpInput.lpInputID, commandTime]
THEN ERROR;
        END;
        commandTime.scheduledAtTime ← simplexValues[i]
      END;
      adjustAmount: AdjustVar = > BEGIN
        srcEventInConnComp: EventInConnComp ← NIL;
        srcEventArrayColNumVal: RefTab.Val ← NIL;
        srcEventArrayColNum: CARD ← 0;
        srcEventInfoVal: CardTab.Val ← NIL;
        timeVal: SymTab.Val ← NIL;
        commandTime: CommandTime ← NIL;

[found, srcEventArrayColNumVal] ←
RefTab.Fetch[lpInput.eventInstanceIDToArrayColNum, adjustAmount.srcEventInstanceID];
          IF NOT found THEN ERROR;

srcEventArrayColNum ← NARROW[srcEventArrayColNumVal, REF CARD] ↑ ;

[found, srcEventInfoVal] ← CardTab.Fetch[lpInput.arrayColNumLookupTable, srcEventArrayColNum];
```

```
       IF NOT found THEN ERROR;

srcEventInConnComp ← NARROW[srcEventInfoVal];

[found, timeVal] ← SymTab.Fetch[srcEventInConnComp.commandTimes,
lpInput.lpInputID];
       IF found THEN commandTime ← NARROW[timeVal]
       ELSE BEGIN
         commandTime ← NEW[CommandTimeInfo];
         IF NOT SymTab.Store[srcEventInConnComp.commandTimes, lpInput.lpInputID,
commandTime] THEN ERROR;
       END;
     SELECT adjustAmount.varType FROM
       amtEarly = > commandTime.amountEarly ← simplexValues[i];
       amtLate = > commandTime.amountLate ← simplexValues[i];
       ENDCASE = > ERROR;
     END;
   ENDCASE = > ERROR;
  ENDLOOP;

};
-- Analysis Routines
 --
 FindClusteredDisplayCommands: PROC [displayCommandList: List.LORA ← NIL] RETURNS
[clusteredCommandList: List.LORA ← NIL] ~ {
  i: INT ← 1;
  IF displayCommandList = NIL THEN RETURN[NIL];

UNTIL i > = List.Length[displayCommandList] DO
   j: INT ← i + 1;
   firstDisplayCommand: DisplayCommand ←
NARROW[List.NthElement[displayCommandList, i]];
   nextDisplayCommand: DisplayCommand ←
NARROW[List.NthElement[displayCommandList, j]];
   currClusteredCommand: ClusteredCommand;

currClusteredCommand ← NEW[ClusteredCommandInfo ← [
    mediaItemID: firstDisplayCommand.mediaItemID,
    mediaItemInstanceID: firstDisplayCommand.mediaItemInstanceID,
    time: firstDisplayCommand.commandTime,
    clusteredDisplayCommands: LIST[firstDisplayCommand]
    ]];
```

```
    WHILE firstDisplayCommand.commandTime = nextDisplayCommand.commandTime AN
firstDisplayCommand.mediaItemInstanceID = nextDisplayCommand.mediaItemInstanceID
AND j < = List.Length[displayCommandList] DO
    currClusteredCommand.clusteredDisplayCommands ←
List.Append[currClusteredCommand.clusteredDisplayCommands,
LIST[nextDisplayCommand] ];
    j ← j + 1;
    IF j < = List.Length[displayCommandList] THEN nextDisplayCommand ←
NARROW[List.NthElement[displayCommandList, j]];
    ENDLOOP;
    IF j > i + 1 THEN clusteredCommandList ← List.Append[clusteredCommandList,
LIST[currClusteredCommand]];
    i ← j;
    ENDLOOP;
};
--
CompareDisplayCommands: List.CompareProc ˜ {
firstCommand: DisplayCommand ← NARROW[ref1];
secondCommand: DisplayCommand ← NARROW[ref2];
comparison: Basics.Comparison;

IF firstCommand = NIL OR secondCommand = NIL THEN ERROR;

-- Sort display commands by command time. We can ignore the base time because it is [0,
for all of the commands. If times are equal, then sort by primitive entity ID. If primitive enti
IDs are equal, then sorted according to the order of events in the primitive entity. If no sort
proc exists for this media type, then sort by the order of cleats in the descriptor.
    comparison ←
ScheduleGenAndViewtimePrivate.CompareTimeIntervals[firstCommand.commandTime,
secondCommand.commandTime];
    IF comparison # equal THEN RETURN[comparison];

IF firstCommand.mediaItemInstanceID # secondCommand.mediaItemInstanceID THEN
BEGIN
    comparison ← Rope.Compare[firstCommand.mediaItemInstanceID.id,
secondCommand.mediaItemInstanceID.id];
    IF comparison # equal THEN RETURN[comparison] ELSE ERROR;
    END;
    comparison ← PrimitiveObj.CompareEvents[firstCommand.mediaItemID,
firstCommand.eventID, secondCommand.eventID];
    IF comparison # incomparable THEN RETURN[comparison] ELSE ERROR;
};

END.
```

It is therefore evident that there has been provided in accordance with the present invention, a method and systems that fully satisfy the aims and advantages hereinbefore set forth. While this invention has been described in conjunction with a specific embodiment thereof, it is evident that many alternatives, modifications and variations will be apparent to those skilled in the art. Accordingly, the invention as herein described is intended to embrace all such alternatives, modifications and variations as fall within the scope of the appended claims.

What is claimed:

1. A method of temporally formatting first and second temporally related media items included in a time-dependent document in an information presentation system; the information presentation system including memory for storing data, a processor connected for accessing the data stored in the memory, and at least one media presentation device; the data stored in the memory including instruction data indicating instructions the processor executes; the method comprising:

operating the processor to obtain, for each of the first and second media items, at least one pair of temporally adjacent media item event data items, referred to as a pair of temporally adjacent events, identifying a media item segment; each event in each pair of temporally adjacent events marking a point in time in the respective media item such that a second event in the pair of events follows a first event in time; each media item segment indicating whether occurrence of the media item segment in the time-dependent document is predictable or unpredictable;

operating the processor to obtain temporal constraint data indicating a time ordering relation value specified between first and second temporally related event data items, referred to hereafter as a pair of temporally related events, identified from among the temporally adjacent events; a first one of the temporally related events being an event included in a media item segment in the first media item and a second one of the temporally related events being an event included in a media item segment in the second media item;

operating the processor to obtain a durational time data item, hereafter referred to as a duration, for each respective media item segment; each durational time data item indicating an elapsed time for presenting the respective media item segment on the at least one media presentation device; each durational time data item further indicating whether the duration is predictable or unpredictable; each predictable duration indicating a range of predictable elapsed presentation durations for a respective media item segment; and for each respective media item segment having a predictable occurrence and a predictable media segment duration, operating the processor to assign a document presentation time value to each event included in the respective media item segment using the range of predictable elapsed presentation durations indicated for the respective media item segment and using the temporal constraint data specified between the respective media item segment and a second media item segment; each respective media item segment for which document presentation time values are assigned having a computed presentation duration falling within the range of predictable elapsed durations for the respective media item segment; the document presentation time values assigned satisfying the temporal constraint data specified between the respective media item segment and the second media item segment.

2. The temporal formatting method of claim 1 wherein each respective media item segment indicates flexibility metric data measuring a presentation quality of the respective media item segment at each of selected durations within the range of predictable elapsed presentation durations when the media item segment is presented by the at least one media presentation device for the selected duration; and operating the processor to assign the document presentation time value to each event in each respective media item segment includes selecting a duration, referred to as a selected duration, within the range of predictable elapsed presentation durations using the flexibility metric data, and assigning the document presentation time values to the respective media item segment on the basis of the selected duration; the selected duration being the duration in the range of durations that simultaneously produces document presentation time values that satisfy the temporal constraint data specified between the respective media item segment and a second media item segment and that provide an acceptable presentation quality when the respective media item segment is presented by the at least one media presentation device for the selected duration.

3. The temporal formatting method of claim 1 where in the range of predictable elapsed presentation durations for a respective media item segment further includes an optimum duration indicating a durational time value that produces a preferred presentation quality for the respective media item segment when the respective media item segment is presented by the at least one media presentation device for the optimum duration;

wherein each respective media item segment indicates flexibility metric data measuring a deviation from the preferred presentation quality of the respective media item segment at respective durations other than the optimum duration within the range of predictable elapsed presentation durations when the media item segment is presented by the at least one media presentation device for the respective duration; and wherein, when document presentation time values cannot be assigned that are consistent with the optimum duration for the respective media item segment and still satisfy the temporal constraint data, the step of operating the processor to assign a document presentation time value to each event in each respective media item segment includes using the flexibility metric data to determine an adjusted predictable elapsed duration larger or smaller than the optimum duration, referred to as an adjusted duration, within the range of predictable elapsed presentation durations indicated by the respective media item segment; the adjusted duration producing assigned document presentation time values satisfying the temporal constraint data specified between the respective media item segment and a second media item segment while producing a presentation quality that deviates by an acceptable amount from the preferred presentation quality of the respective media item segment, as measured by the flexibility metric data.

4. The temporal formatting method of claim 3 wherein the flexibility metric data indicates a penalty value for adjusting the predictable elapsed presentation duration of a respective media item segment to an adjusted duration different from the optimum duration; and using the flexibility metric data to determine the adjusted predictable elapsed presentation duration for a respective media item segment includes shortening or lengthening the optimum duration such that the adjusted duration incurs a minimal penalty value.

5. The temporal formatting method of claim 4 wherein the penalty value indicated by the flexibility metric for each respective media item segment is a cost associated with shortening or lengthening the optimum duration of the respective media item segment, and wherein the step of using the flexibility metric data to determine the adjusted predictable elapsed presentation duration includes optimizing an overall cost of lengthening and shortening media item segment durations for respective media item segments.

6. The temporal formatting method of claim 5 wherein optimizing the overall cost includes solving a function of at least three variables including a time at which each event should occur, a length of time an event occurs prior to its optimum time of occurrence, and a length of time an event occurs later than its optimum time of occurrence; the values of the at least three variables being subject to a plurality of linear constraints selected from a group of constraints including media item segment durations, the cost associated with shortening or lengthening the optimum duration of a respective media item segment, and temporal constraint data.

7. The temporal formatting method of claim 1 wherein each media item includes only one pair of temporally adjacent media item event data items identifying a media item segment such that the one pair of temporally adjacent events marks beginning and ending points in time respectively of the media item and defines a media item having coarse granularity;

the temporal constraint data indicates a time ordering relation value specified between a beginning or ending event of the first media item and a beginning or ending event of the second media item; and assigning document presentation times assigns times to the beginning and ending events in each media item.

8. The temporal formatting method of claim 1 wherein each media item includes two or more pairs of temporally adjacent media item event data items identifying two or more media item segments defining a media item having fine granularity; each media item segment being a portion of a media item.

9. The temporal formatting method of claim 1 wherein the media item segment is a dynamic media item segment producing a series of changing perceptions to a document reader during presentation of the dynamic media item segment in the time-dependent document; the media segment duration of the dynamic media item segment being a cumulative duration of each of the series of changing perceptions.

10. The temporal formatting method of claim 1 wherein the media item segment is a static media item segment producing a single static, unchanging perception to a document reader during presentation of the static media item segment in the time-dependent document; the media segment duration of the static media item segment being imposed on the static media item segment and indicating a durational time value for presenting the static media item segment during presentation of the time-dependent document.

11. The temporal formatting method of claim 1 wherein assigning document presentation times to events included in media item segments occurs prior to the runtime presentation of the time-dependent document to a user of the information presentation system.

12. The temporal formatting method of claim 11 further including operating the processor to identify as having unpredictable behavior each respective media item segment indicating an unpredictable occurrence or an unpredictable media segment duration; and operating the processor to produce a second schedule data structure including a presentation command for each media item segment indicating unpredictable behavior; the presentation command indicating an unresolved document presentation time assigned to a starting event in a media item segment having an unpredictable occurrence; the presentation command further indicating an unresolved document presentation time assigned to an ending event in a media item segment having an unpredictable duration.

13. The temporal formatting method of claim 12 further including operating the processor to assign document presentation times to the unresolved document presentation times in the second schedule data structure at the time the time-dependent document is presented under the control of the first schedule data structure; the first and second schedule data structures together controlling presentation of media items having predictable and unpredictable behavior in the time-dependent document.

14. The temporal formatting method of claim 1 further including operating the processor to produce a first schedule data structure for controlling presentation by the at least one media presentation device of each respective predictable media item segment having a predictable occurrence and a predictable duration; the first schedule data structure including a presentation command indicating the document presentation time value for each media item event data item; the first schedule data structure, when used to control presentation of the time-dependent document, causing a pair of temporally related media items to be presented at assigned document presentation times that satisfy the time ordering relation specified between them.

15. A method for use in a processor-controlled machine for temporally formatting a time-dependent document, hereafter referred to as a multimedia document, including a plurality of media items each capable of producing human perceptions when presented by a media presentation device; the processor-controlled machine including memory for storing data, and a processor connected for accessing the data stored in the memory; the data stored in the memory including instruction data indicating instructions the processor executes to control operation of the machine; the method comprising:

obtaining from memory, for each media item included in the multimedia document, media item duration data, flexibility metric data, and temporal constraint data; the media item duration data indicating a range of durational presentation time values, referred to as durations, for the respective media item; the range of durations including an optimum duration; the flexibility metric data indicating a measurement associated with each of selected durations other than the optimum duration within the range of durations; the measurement indicating the temporal constraint data indicating a time ordering relation value specified between a respective media item and a second media item; and assigning document presentation time values to media items using the media item duration data, the flexibility metric data, and the temporal constraint data; each document presentation time value assigned to a respective one of the media items producing a computed duration within the range of durations indicated for the respective media item, and satisfying the temporal constraint data specified between the respective media item and a second media item; the document presentation time values assigned to media items being computed by solving a function that optimizes a measurement associated with lengthening and shortening media item durations for respective media items; the function being subject to a plurality of constraints selected from a group of constraints including media item durations, flexibility metric data for respective media item durations, and temporal constraint data between pairs of media items.

16. The temporal formatting method of claim 15 wherein the optimum duration specified for a respective media item indicates a durational time value that produces a preferred presentation quality for the respective media item when the respective media item is presented by a media presentation device for the optimum duration;

wherein the flexibility metric data associating a measurement with each of selected durations within the range of durations is cost data indicating a quality of presentation cost associated with deviating from the optimum duration by shortening or lengthening the optimum duration of a respective media item;

wherein the group of constraints to which the function is subject includes the cost data; and wherein the function is solved to optimize an overall quality of presentation associated with shortening or lengthening the optimum duration of respective media items while still satisfying the temporal constraint data specified between pairs of media items.

17. The temporal formatting method of claim 16 further including obtaining from memory, for each media item included in the multimedia document, a first data item indicating whether occurrence of the media item in the multimedia document is predictable or unpredictable, and a second data item indicating whether the media item duration is predictable or unpredictable; and wherein the step of assigning document presentation time values to media items includes identifying media items having predictable behavior, wherein predictable behavior is defined as having a predictable occurrence and a predictable duration, using the first and second data items; and solving the function for media items having predictable behavior.

18. The temporal formatting method of claim 17 further including identifying as having unpredictable behavior each respective media item segment indicating an unpredictable occurrence or an unpredictable media segment duration; and assigning an unresolved document presentation starting time to a media item having an unpredictable occurrence and assigning an unresolved document ending presentation time to media item having an unpredictable duration.

19. A method of temporally formatting a plurality of media items included in a time-dependent document in an information presentation system; the information presentation system including memory for storing data, a processor connected for accessing the data stored in the memory, and a plurality of media presentation devices; the data stored in the memory including instruction data indicating instructions the processor executes; the method comprising:

operating the processor to obtain, for each media item, at least one pair of temporally adjacent media item event data items, referred to as a pair of temporally adjacent events, identifying a media item segment; each event in a pair of temporally adjacent events marking a point in time in the respective media item segment such that a second event in the pair of events follows a first event in time with no intervening media item events specified between the pair of temporally adjacent events; each media item segment indicating whether occurrence of the media item segment in the time-dependent document is predictable or unpredictable;

operating the processor to obtain a durational time data item, hereafter referred to as a duration, for each respective media item segment; each durational time data item indicating an elapsed time for presentation of the media item segment by a respective one of the media presentation devices; each durational time data item further indicating whether the duration is predictable or unpredictable; each predictable duration including a range of predictable elapsed presentation durations including a minimum duration, an optimum duration, and a maximum duration for presenting the respective media item segment; the optimum duration indicating a durational time value that produces a preferred presentation quality for the respective media item segment when the respective media item segment is presented by a respective one of the media presentation devices for the optimum duration; each predictable duration further indicating flexibility metric data measuring a deviation from the preferred presentation quality of the respective media item segment at each respective duration within the range of durations when the media item segment is presented by the at least one media presentation device for the respective duration; the flexibility metric data indicating a penalty value for adjusting the predictable elapsed presentation duration of a respective media item segment to an adjusted duration different from the optimum duration;

operating the processor to obtain temporal constraint data indicating a time ordering relation value specified between first and second temporally related event data items, referred to hereafter as a pair of temporally related events, identified from among the temporally adjacent events; a first one of the temporally related events being an event included in a first media item segment and a second one of the temporally related events being an event included in a second media item segment;

operating the processor to identify media item segments indicating a predictable occurrence and a predictable media segment duration as having predictable behavior, and to identify media item segments indicating an unpredictable occurrence or an unpredictable media segment duration as having unpredictable behavior;

for each respective media item segment having predictable behavior, operating the processor to assign a document presentation time value to each event included in the respective media item segment; each document presentation time value assigned producing a computed duration within the range of durations indicated for the respective media item segment, and satisfying the temporal constraint data specified between the respective media item segment and a second media item segment; the computed duration being an adjusted duration when document presentation time values cannot be assigned that are consistent with the optimum duration for the respective media item segment and still satisfy the temporal constraint data; the adjusted duration being determined using the flexibility metric data and producing assigned document presentation time values satisfying the temporal constraint data specified between the respective media item segment and a second media item segment while producing a presentation quality that deviates by an acceptable amount from the preferred presentation quality of the respective media item segment, as measured by an acceptably small penalty value indicated by the flexibility metric data; and for each respective media item segment having unpredictable behavior, operating the processor to assign an unresolved document presentation time to a starting event in a media item segment having an unpredictable occurrence, and to assign an unresolved document presentation time assigned to an ending event in a media item segment having an unpredictable duration.

20. The temporal formatting method of claim 19 further including operating the processor to produce a first schedule data structure for controlling presentation on the at least one media presentation device of each respective predictable media item segment having predictable behavior; the first schedule data structure including a presentation command indicating the document presentation time value for each media item event data item; the first schedule data structure, when used to control presentation of the time-dependent document, causing a pair of temporally related media items to be presented at assigned document presentation times that satisfy the time ordering relation specified between them;

operating the processor to produce a second schedule data structure including a presentation command for each media item segment indicating unpredictable behavior; the presentation command indicating an unresolved document presentation time assigned to a starting event in a media item segment having an unpredictable occurrence; the presentation command further indicating an unresolved document presentation time assigned to an ending event in a media item segment having an unpredictable duration; and operating the processor to assign document presentation times to the unresolved document presentation times in the second schedule data structure at the time the time-dependent document is presented under the control of the first schedule data structure; the first and second schedule data structures together controlling presentation of media items having predictable and unpredictable behavior in the time-dependent document.

21. The temporal formatting method of claim 19 wherein the penalty value indicated by the flexibility metric for each respective media item segment is a cost associated with shortening or lengthening the optimum duration of the respective media item segment, and wherein the step of operating the processor to assign document presentation time values to events included in respective media item segments includes solving a function to optimize an overall cost of lengthening and shortening media item segment durations for respective media item segments.

22. The temporal formatting method of claim 19 wherein the time ordering relation specified between temporally related events specifies a time ordering relation between media item segments included in the same media item.

23. The temporal formatting method of claim 19 wherein the time ordering relation specified between temporally related events specifies a time ordering relation between media item segments included in different media items. Serial No. 08/148,743

24. The temporal formatting method of claim 19 wherein the step of operating the processor to identify media item segments having predictable and unpredictable behavior includes grouping media item event data items, referred to as events, included in media item segments into connected components of temporally related events using respective media item durations and temporal constraint data; a first event being temporally related to a second event if a time ordering relation is specified between the first and second events or if the first and second event identify a media item segment having a media item duration; a first connected component including events having no temporal relationship to events included in a second connected component; and evaluating each connected component to determine whether the connected component has predictable or unpredictable behavior; a connected component having unpredictable behavior when the connected component includes an unpredictable event or an event is included in a media item segment indicating an unpredictable duration; a connected component having predictable behavior when the connected component includes only predictable events each included in a media item segment indicating a predictable duration.

25. The temporal formatting method of claim 24 wherein the step of operating the processor to assign document presentation times to events included in media item segments having predictable behavior includes positioning events in each connected component in relative temporal order within the connected component.

26. A method for use in a processor-controlled multimedia authoring system for temporally formatting a multimedia document including a plurality of media items each capable of producing human perceptions when presented by a media presentation device; the multimedia authoring system including input circuitry connected to a user input device for producing user signals indicating actions of a system user; memory for storing data; at least one media presentation device; and a processor connected for receiving the user signals from the input circuitry, for accessing the data stored in the memory, and for presenting signals indicating a media item to the media presentation device; the data stored in the memory including instruction data indicating instructions the processor executes; the method comprising:

receiving first user signals from the user input device indicating actions identifying media items to be included in a multimedia document;

in response to the first user signals, producing a media item data structure for each respective media item identified for inclusion in the multimedia document; the media item data structure indicating starting and ending events in the media item;

receiving second user signals from the user input device indicating actions assigning durations and duration measurement data to each respective media item;

in response to the second user signals, modifying the media item data structure to further indicate a durational time data item, hereafter referred to as a duration, used by a media presentation device for presentation of the media item from the starting event to the ending event; a duration indicating a range of elapsed presentation durations for a respective media item including an optimum duration; a duration further indicating flexibility metric data associating duration measurement data at selected durations other than the optimum duration within the range of elapsed presentation durations when the media item is presented by a media presentation device for the selected duration;

receiving third user signals from the user input device indicating actions assigning temporal constraints to pairs of media items;

in response to the third user signals, producing and storing temporal constraint data indicating a time ordering relation value specified by the user between media items;

receiving fourth user signals from the user input device indicating a request to produce a main schedule for the media items included in the multimedia document; and in response to the fourth user signals, assigning document presentation time values to events included in respective media items; the document presentation time values assigned producing a computed duration for each media item that falls within the range of elapsed presentation durations for the respective media item while satisfying the temporal constraint data specified between a respective pair of media items; the computed duration for a respective media item being an adjusted duration when the optimum duration specified for a respective media item would not produce document presentation time values that satisfy the temporal constraint data specified between a respective pair of media items; the adjusted duration being determined by solving a function to optimize an overall measurement associated with lengthening and shortening media item durations for respective media items; the function being subject to a plurality of constraints selected from a group of constraints including media item durations, the flexibility metric data associated with selected durations, and temporal constraint data.

27. The method for temporally formatting a multimedia document of claim 26 wherein the optimum duration specified for a respective media item indicates a durational time value that produces a preferred presentation quality for the respective media item when the respective media item is presented by a media presentation device for the optimum duration;

wherein the flexibility metric data associating a measurement with each of selected durations within the range of durations is cost data indicating a quality of presentation cost associated with deviating from the optimum duration by shortening or lengthening the optimum duration of a respective media item;

wherein the group of constraints to which the function is subject includes the cost data; and wherein the function is solved to optimize an overall quality of presentation associated with shortening or lengthening the optimum duration of respective media items while still satisfying the temporal constraint data specified between pairs of media items.

28. The method for temporally formatting a multimedia document of claim 26 wherein the media item data structure further indicates whether occurrence of the media item in the time-dependent document is predictable or unpredictable, and whether the duration is predictable or unpredictable; and wherein the method further includes producing a main schedule including document presentation time values assigned for media items having predictable behavior;

producing an auxiliary schedule in addition to the main schedule; the auxiliary schedule indicating an unresolved document presentation time for each media item having an unpredictable duration or an unpredictable occurrence;

receiving fifth user signals indicating a request from the user to present the multimedia document according to the main and auxiliary schedules, and in response to the fifth user signals, presenting the media items included in the multimedia document on the media presentation device according to the document presentation time values assigned in the main and auxiliary schedules; document presentation time values being assigned to the unresolved document presentation time values in the auxiliary schedule during runtime as the multimedia document is being presented.

29. The method for temporally formatting a multimedia document of claim 26 wherein the first user signals from the user input device further indicate actions identifying media item segments included in the media items to be included in a multimedia document;

each media item segment is identified in the media item data structure for a respective media item by a pair of temporally adjacent media item event data items, referred to as a pair of temporally adjacent events; each event in each pair of temporally adjacent events marking a point in time in the respective media item such that a second event in the pair of events follows a first event in time with no intervening events specified between the first and second events;

the third user signals from the user input device further indicates actions assigning temporal constraints to a pair of events included in a single media item or included in respective first and second media items; a pair of events having a time ordering relation value specified therefor being referred to as a pair of temporally related events; the user having the capability to specify a time ordering relation between events internal to the single media item or to the respective first and second media items; and the step of assigning document presentation time values further includes assigning document presentation time values to the events included in media item segments; the document presentation time values assigned producing a computed duration for each media item segment that falls within the range of elapsed presentation durations for the respective media item while satisfying the temporal constraint data specified between a respective pair of temporally related events; the function optimizing an overall measurement associated with lengthening and shortening media item durations for respective media item segments.

30. A machine for temporally formatting a time-dependent document, hereafter referred to as a multimedia document, including a plurality of media items each capable of producing human perceptions when presented by a media presentation device; the machine including memory for storing data, and a processor connected for accessing the data stored in the memory;

the data stored in the memory including instruction data indicating instructions the processor executes;

the processor, in executing the instructions stored in the memory, obtaining from memory, for each media item included in the multimedia document, media item duration data and temporal constraint data; the media item duration data indicating a range of durational presentation time values, referred to as durations, for the respective media item; the range of durations including an optimum duration; the media item duration data further indicating flexibility metric data associating a measurement with each of selected durations other than the optimum duration within the range of durations; the temporal constraint data indicating a time ordering relation value specified between a respective media item and a second media item;

the processor, further in executing the instructions stored in the memory, assigning document presentation time values to media items; each document presentation time value assigned to a respective one of the media items producing a computed duration within the range of durations indicated for the respective media item, and satisfying the temporal constraint data specified between the respective media item and a second media item; the document presentation time values assigned to media items being computed by solving a function to optimize a measurement associated with lengthening and shortening media item durations for respective media items; the function being subject to a plurality of constraints selected from a group of constraints including media item durations, flexibility metric data for respective media item durations, and temporal constraint data between pairs of media items.

31. The machine of claim 30 wherein the optimum duration specified for a respective media item indicates a durational time value that produces a preferred presentation quality for the respective media item when the respective media item is presented by a media presentation device for the optimum duration;

wherein the flexibility metric data associating a measurement with each of selected durations within the range of durations is cost data indicating a quality of presentation cost associated with deviating from the optimum duration by shortening or lengthening the optimum duration of a respective media item;

wherein the group of constraints to which the function is subject includes the cost data; and wherein the function is solved to optimize an overall quality of presentation associated with shortening or lengthening the optimum duration of respective media items while still satisfying the temporal constraint data between pairs of media items.

32. A processor-controlled multimedia authoring system for producing, temporally formatting, and presenting a multimedia document including a plurality of media items; the system including input circuitry connected to a user input device for producing user signals indicating actions of a system user;

a media signal source for storing or receiving a plurality of sets of signals; each set of signals indicating a media item capable of producing human perceptions when presented by a media presentation device;

first output circuitry connected to a first media presentation device having a display area for presenting images;

second output circuitry connected to a second media presentation device for receiving audio signals and presenting sound using the audio signals;

a processor connected for receiving the user signals from the input circuitry, connected for providing images to the first output circuitry, and connected for providing audio signals to the second output circuitry;

memory for storing data; the data stored in the memory including instruction data indicating instructions the processor executes;

the processor being further connected for accessing the data stored in the memory;

the processor, in executing the instructions, receiving first user signals from the user input device indicating actions identifying media item segments of media items to be included in a multimedia document; the processor, in executing the instructions in response to the first user signals, producing a media item data structure indicating data for a respective one of the media items included in the multimedia document; the media item data structure indicating at least one pair of temporally adjacent media item event data items, referred to as a pair of temporally adjacent events, identifying a media item segment; each event in each pair of temporally adjacent events marking a point in time in the respective media item such that a second event in the pair of events follows a first event in time; the media item data structure further indicating whether occurrence of the media item segment in the time-dependent document is predictable or unpredictable;

the processor, further in executing the instructions, receiving second user signals from the user input device indicating actions assigning durations and measurement values to respective media item segments; the processor, in executing the instructions in response to the second user signals, modifying the media item data structure indicating a respective media item segment to further indicate a durational time data item, hereafter referred to as a duration, used by a media presentation device for presentation of the media item segment; the media item data structure further indicating whether the duration is predictable or unpredictable; each predictable duration indicating a range of predictable elapsed presentation durations for a respective media item segment indicating a range of durations including an optimum duration; the optimum duration indicating a durational time value that produces a preferred presentation quality for the respective media item segment when the respective media item segment is presented by a media presentation device for the optimum duration; each predictable duration further indicating cost data measuring a cost of deviation from the preferred presentation quality of the respective media item segment at respective durations other than the optimum duration within the range of predictable elapsed presentation durations when the media item segment is presented by a media presentation device for the respective duration;

the processor, further in executing the instructions, receiving third user signals from the user input device indicating actions assigning temporal constraints to pairs of media item segments; the processor, in executing the instructions in response to the third user signals, producing and storing temporal constraint data indicating a time ordering relation value specified by the user between events, identified from among the temporally adjacent events indicated by each media item data structure; a pair of events having a time ordering relation value specified therefor being referred to as a pair of temporally related events;

the processor, further in executing the instructions, receiving fourth user signals from the user input device indicating a request to produce a main schedule for media items included in the multimedia document having predictable occurrences and predictable durations; the processor, in executing the instructions in response to the fourth user signals, assigning document presentation time values to events included in respective media item segments; the document presentation time values assigned satisfying the temporal constraint data specified between a respective pair of temporally related events while producing a presentation quality for a respective media item segment that deviates, when necessary, by an acceptable amount from the preferred presentation quality of the respective media item segment, as measured by the cost data; the processor, further in executing the instructions for assigning document presentation time values, solving a function to optimize an overall cost of lengthening and shortening media item segment durations for respective media item segments; the function being subject to a plurality of constraints that are selected from a group of constraints including media item segment durations, the cost data associated with deviating from the optimum duration by shortening or lengthening the optimum duration of a respective media item segment, and temporal constraint data.

33. The processor-controlled multimedia authoring system of claim 32 wherein the processor, further in executing the instructions, produces an auxiliary schedule in addition to the main schedule; the auxiliary schedule indicating an unresolved document presentation time for each media item segment having an unpredictable duration or an unpredictable occurrence; and the processor, further in executing the instructions, in response to fifth user signals indicating a request from the user to present the multimedia document according to the main and auxiliary schedules, presents the multimedia document according to the document presentation time values assigned in the main and auxiliary schedules, using media items stored in the media signal source and presenting media items on the first and second media presentation devices; the processor, in executing the instructions for presenting the multimedia document, assigning document presentation time values to the unresolved document presentation time values in the auxiliary schedule as the multimedia document is being presented.

* * * * *